United States Patent
Oshima et al.

(10) Patent No.: US 11,169,174 B2
(45) Date of Patent: Nov. 9, 2021

(54) MEMS ELECTROSTATIC CAPACITOR TYPE ACCELERATION SENSOR

(71) Applicant: HITACHI, LTD., Tokyo (JP)

(72) Inventors: Takashi Oshima, Tokyo (JP); Yuki Furubayashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 190 days.

(21) Appl. No.: 16/551,206

(22) Filed: Aug. 26, 2019

(65) Prior Publication Data

US 2020/0072865 A1 Mar. 5, 2020

(30) Foreign Application Priority Data

Aug. 29, 2018 (JP) .............................. JP2018-160660

(51) Int. Cl.
| | |
|---|---|
| *G01P 15/125* | (2006.01) |
| *G01P 15/13* | (2006.01) |
| *G01P 15/08* | (2006.01) |

(52) U.S. Cl.
CPC ............ *G01P 15/125* (2013.01); *G01P 15/13* (2013.01); *G01P 15/131* (2013.01); *G01P 2015/0865* (2013.01)

(58) Field of Classification Search
CPC ...... G01P 15/125; G01P 15/13; G01P 15/131; G01P 15/0802; G01P 2015/0862; G01P 2015/0865
See application file for complete search history.

(56) References Cited

U.S. PATENT DOCUMENTS

| | | | | |
|---|---|---|---|---|
| 5,821,420 | A * | 10/1998 | Cho ................... | G01C 19/5607 73/504.16 |
| 5,852,242 | A * | 12/1998 | Devolk ................ | G01P 15/125 73/514.17 |
| 6,497,149 | B1 * | 12/2002 | Moreau ................ | G01P 15/125 73/514.32 |
| 2007/0029629 | A1 * | 2/2007 | Yazdi ..................... | G01P 1/023 257/414 |
| 2014/0230551 | A1 * | 8/2014 | Kunimi ............... | G01P 15/0802 73/514.32 |
| 2016/0091524 | A1 * | 3/2016 | Kamada ................ | B81B 3/0086 73/514.32 |
| 2016/0091525 | A1 | 3/2016 | Oshima et al. | |
| 2018/0011125 | A1 * | 1/2018 | Oshima ................ | G01P 15/125 |
| 2020/0088759 | A1 * | 3/2020 | Oshima ................ | G01P 15/125 |

FOREIGN PATENT DOCUMENTS

| | | | | |
|---|---|---|---|---|
| JP | 2016-070815 A | | 5/2016 | |
| WO | WO-2016132447 A1 * | | 8/2016 | .......... G01P 15/0802 |

* cited by examiner

*Primary Examiner* — Helen C Kwok

(74) *Attorney, Agent, or Firm* — Volpe Koenig

(57) ABSTRACT

In a MEMS electrostatic capacitor type acceleration sensor, the manufacturing costs of MEMS elements are reduced, and at the same time, the variations of the electrical and mechanical characteristics of the MEMS elements are reduced. A detection circuit generates a voltage signal corresponding to the product of a difference between the two capacitance values of a pair of MEMS capacitors and a servo signal. A modulation circuit outputs a signal corresponding to the difference between the capacitance values using the servo signal. The control circuit outputs the servo signal on the basis of a signal corresponding to the difference between the capacitance values.

14 Claims, 15 Drawing Sheets

MEMS ELECTROSTATIC CAPACITOR TYPE ACCELERATION SENSOR

BACKGROUND

The present invention relates to MEMS electrostatic capacitor type acceleration sensors.

In a reflection seismic exploration for exploring petroleum, natural gas, and the like, a large number of acceleration sensors are installed on the surface of a geological stratum where resources are predicted to be reserved in such a way that the acceleration sensors are distributed in a predefined two-dimensional arrangement. Subsequently, an artificial earthquake is generated, and the accelerations of the reflection waves reflected on the geological stratum are detected by the acceleration sensors.

Acceleration data detected simultaneously by the group of sensors, which are distributed in a two-dimensional arrangement, are analyzed, the condition of the geological stratum is checked, and it is judged whether or not there are resources such as petroleum resources, natural gas resources. Since an acceleration sensor for the reflection seismic exploration is used for detecting faint acceleration signals, the acceleration sensor is required to have noises that are several orders of magnitude smaller than the noises of acceleration sensors used for other fields.

Therefore, a geophone has conventionally been used as an extremely low-noise acceleration sensor. Nevertheless, for the reason that the geophone has large noises in a low-frequency band lower than several tens Hz, the input frequency bandwidth of the geophone is narrow in principle, and the geophone is unsuitable for mass production, the geophone is considered unsuitable to be used for a next-generation high-accuracy seismic exploration.

For this reason, MEMS (Micro Electro Mechanical Systems) acceleration sensors begins to attract attention as sensors used for the next-generation high-accuracy seismic exploration. In the next-generation high-accuracy seismic exploration, about one million acceleration sensors are used. MEMS sensors are required to have extremely low noises, and at the same time, they are required to be low in cost. Therefore, the reduction in the cost of batteries by making the MEMS acceleration sensors low-power-consumption type sensors, the reduction in the manufacturing costs of the MEMS acceleration sensors, and the improvement in the yield of MEMS acceleration sensor manufacturing by reducing manufacturing variations.

Japanese Unexamined Patent Application Publication No. 2016-070815 discloses a technology about a MEMS acceleration sensor. To put it concretely, in Japanese Unexamined Patent Application Publication No. 2016-070815, a MEMS for detecting acceleration signals and a MEMS for applying servo forces are provided. With the use of these two kinds of MEMSs, acceleration signal detection and servo control are performed simultaneously in parallel.

SUMMARY

Actually, MEMS sensors are required to have low noises and to be low-power-consumption type sensors, and additionally the manufacturing costs of MEMS elements are required to be low, and the variations of the electrical and mechanical characteristics of the MEMS elements are also low.

In Japanese Unexamined Patent Application Publication No. 2016-070815, since acceleration signal detection and servo control are performed simultaneously in parallel, the structures of the MEMS elements become larger-sized and more complicated in comparison with the case of the time-division processing being performed. For this reason, it becomes difficult to reduce the manufacturing costs of the MEMS elements, and it also becomes difficult to reduce the variations of the electrical and mechanical characteristics of the MEMS elements.

An object of the present invention is to reduce the manufacturing costs of MEMS elements, and the same time reduce the variations of the electrical and mechanical characteristics of the MEMS elements used for a MEMS electrostatic capacitor type acceleration sensor.

A MEMS electrostatic capacitor type accelerator sensor according to an aspect of the present invention includes: a pair of MEMS capacitors including a movable electrode, a first fixed electrode, and a second fixed electrode; a detection circuit connected to the movable electrode; a demodulation circuit connected to the detection circuit; and a control circuit that is connected to the demodulation circuit and outputs a binary servo signal. In the abovementioned MEMS electrostatic capacitor type accelerator sensor, a voltage signal based on the servo signal output by the control circuit is applied to the first fixed electrode, a voltage signal based on a signal obtained by logically reversing the servo signal is applied to the second fixed electrode, and an electrostatic force, which balances with an inertial force generated on the movable electrode by applying an acceleration signal and the direction of which is opposite to the direction of the inertial force, is generated on the movable electrode. The detection circuit generates a voltage signal corresponding to the product of a difference between the two capacitance values of the pair of the MEMS capacitors and the servo signal, the demodulation circuit outputs a signal corresponding to the difference between the capacitance values using the servo signal, and the control circuit outputs the servo signal on the basis of a signal corresponding to the difference between the capacitance values.

A MEMS electrostatic capacitor type accelerator sensor according to an aspect of the present invention includes: a first pair of MEMS capacitors including a movable electrode, a first fixed electrode, and a second fixed electrode; a second pair of MEMS capacitors including the movable electrode, a third fixed electrode, and a fourth electrode; a detection circuit connected to the movable electrode; a first demodulation circuit connected to the detection circuit; a second demodulation circuit connected to the detection circuit; a first control circuit that is connected to the first demodulation circuit and outputs a first binary servo signal; a second control circuit that is connected to the second demodulation circuit and outputs a second binary servo signal. In the abovementioned MEMS electrostatic capacitor type accelerator sensor, a voltage signal based on the first servo signal output by the first control circuit is applied to the first fixed electrode, a voltage signal based on a signal obtained by logically reversing the first servo signal is applied to the second fixed electrode, and an electrostatic force, which balances with an inertial force generated on the movable electrode by applying an acceleration signal in a first axis direction and the direction of which is opposite to the direction of the inertial force, is generated on the movable electrode, a voltage signal based on the second servo signal output by the second control circuit is applied to the third fixed electrode, a voltage signal based on a signal obtained by logically reversing the second servo signal is applied to the fourth fixed electrode, and an electrostatic force, which balances with an inertial force generated on the movable electrode by applying an acceleration signal in a second axis direction, which is different from the first axis direction, and the direction of which is opposite to the direction of the inertial force, is generated on the movable electrode. The detection circuit generates a first voltage signal corresponding to the product of a difference between the two first capacitance values of the first pair of the MEMS capacitors and the first servo signal, and a second voltage signal corresponding to the product of a difference between the two second capacitance values of the second pair of the MEMS capacitors and the second servo signal. The first demodulation circuit outputs a signal corresponding to the difference between the first capacitance values of the first pair of MEMS capacitors using the first servo signal, and the second demodulation circuit outputs a signal corresponding to the difference between the second capacitance values of the second pair of MEMS capacitors using the second servo signal. The first control circuit outputs the first servo signal on the basis of a signal corresponding to the difference between the first capacitance values of the first pair of MEMS capacitors, and the second control circuit outputs the second servo signal on the basis of a signal corresponding to the difference between the second capacitance values of the second pair of MEMS capacitors.

According to an aspect of the present invention, in a MEMS electrostatic capacitor type acceleration sensor, the manufacturing costs of MEMS elements can be reduced, and at the same time, the variations of the electrical and mechanical characteristics of the MEMS elements can be reduced.

DETAILED DESCRIPTION

Descriptions will be made with reference to the accompanying drawings below.

First, a MEMS electrostatic capacitor type acceleration sensor according to a related technology 1 will be explained with reference to FIG. 1.

Figure 1:
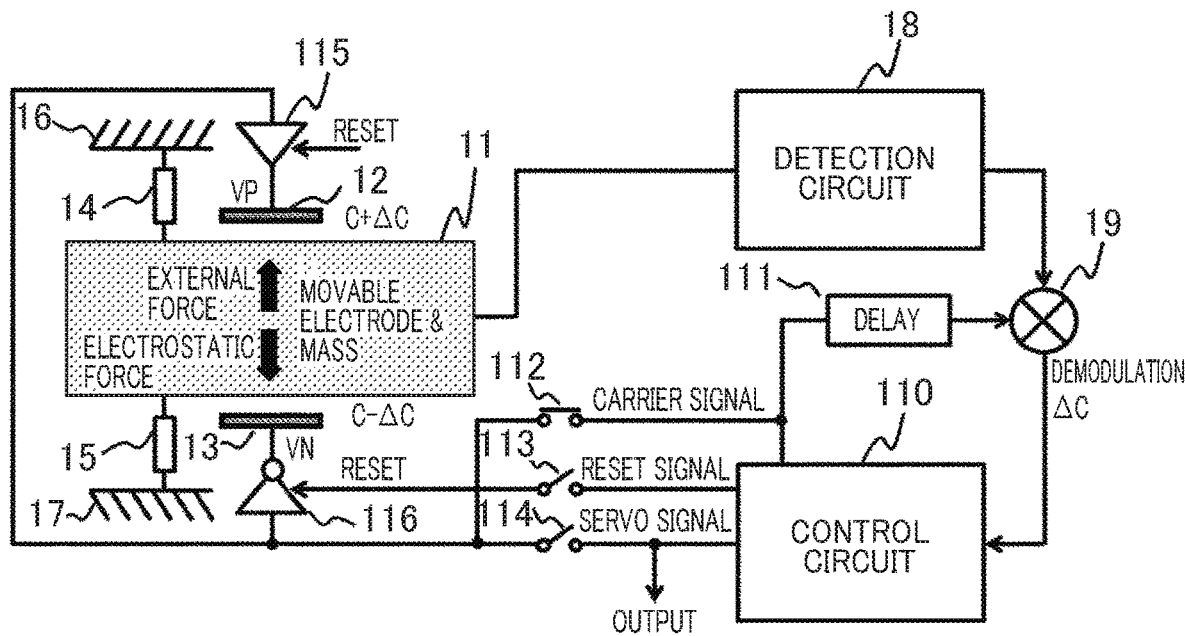
FIG. 1 is a diagram for explaining a MEMS electrostatic capacitor type acceleration sensor according to a related technology 1.

As shown in FIG. 1, the MEMS electrostatic acceleration sensor includes a pair of MEMS capacitors composed of a movable electrode 11 that also plays a role of a mechanical weigh, a fixed electrode 12, and a fixed electrode 13. Therefore, a capacitor with its capacitance value $C+\Delta C$ is formed between the movable electrode 11 and the fixed electrode 12, and a capacitor with its capacitance value $C-\Delta C$ is formed between the movable electrode 11 and the fixed electrode 13. When the movable electrode 11 is located at the center between the fixed electrode 12 and the fixed electrode 13, a capacitance variation $\Delta C$ becomes zero; when the movable electrode 11 is located above the center, the capacitance variation $\Delta C$ has a positive value; and when the movable electrode 11 is located below the center, the capacitance variation $\Delta C$ has a negative value.

In addition, one end of a spring 14 is connected to the movable electrode 11 and the other end is connected to a frame 16, and one end of a spring 15 is connected to the movable electrode 11 and the other end is connected to a frame 17. When the movable electrode 11 is located at the center between the fixed electrode 12 and the fixed electrode 13, the lengths of the spring 14 and spring 15 are natural lengths, and therefore elastic forces exerted by the spring 14 and spring 15 are zero. When the movable electrode 11 is located above the center, the spring 14 contracts, and therefore the spring 14 exerts a downward elastic force on the movable electrode 11.

Furthermore, the spring 15 expands, and therefore the spring 15 also exerts a downward elastic force on the movable electrode 11. Therefore, a downward elastic force, that is a resultant force of the above two forces, is exerted on the movable electrode 11. On the other hand, when the movable electrode 11 is located below the center, the spring 14 expands, and therefore the spring 14 exerts an upward elastic force on the movable electrode 11. Furthermore, the spring 15 contracts, and therefore the spring 15 also exerts an upward elastic force on the movable electrode 11. Therefore, an upward elastic force, that is a resultant force of the above two forces, is exerted on the movable electrode 11.

The movable electrode 11 is connected to a detection circuit 18, the output of the detection circuit 18 is connected to a demodulator 19, and a signal corresponding to the capacitance variation $\Delta C$ is obtained at the output of the demodulator 19. The output of the demodulator 19 is connected to a control circuit 110, and the control circuit 110 generates a 1-bit (binary) servo signal on the basis of the signal corresponding to the capacitance variation $\Delta C$. In addition, the control circuit 110 also generates a carrier signal necessary for detecting the capacitance variation $\Delta C$. The carrier signal is a pulse signal of a constant frequency. Since the carrier signal is also necessary for demodulation, it is applied to the demodulator 19 via a delay device 111. In addition, the control circuit 110 generates a reset signal in order to control mutual interference between the servo control and the acceleration signal detection. The reset signal, the carrier signal, and the servo signal are time-divisionally input into a buffer 115 and an inversion buffer 116 one by one via a switch 113, a switch 112, and a switch 114 respectively. The buffer 115 converts this time-division signal into a voltage signal VP having an appropriate voltage level according to the periods of this time-divisional signal.

Figure 3:
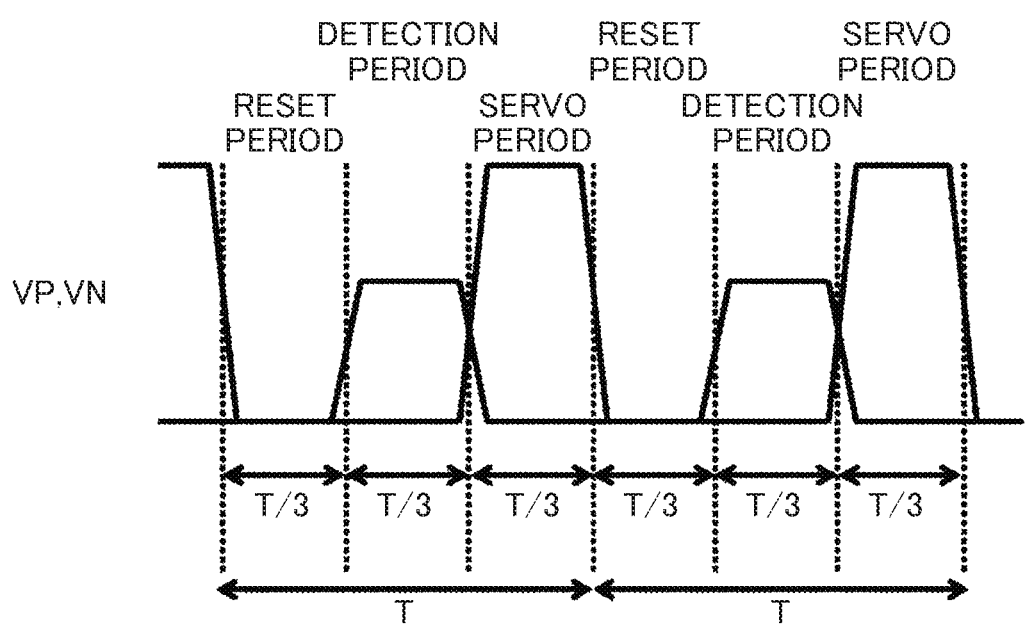
FIG. 3 is an operation time chart of the MEMS electrostatic capacitor type acceleration sensor according to the related technology 1.

As shown in an operation time chart in FIG. 3, the buffer 115 sets the voltage signal VP in a voltage level necessary for the voltage signal VP to work as the carrier signal during the acceleration signal detection period, and sets the voltage signal VP in a voltage level necessary for the voltage signal VP to work as the servo signal during the servo control detection period. Furthermore, the voltage signal VP is set in the ground potential during the reset period. On the other hand, the inversion buffer 116 logically inverses the time-division signal, and, as is the case with the buffer 115, the inversion buffer 116 converts the logically inversed time-division signal into a voltage signal VN having an appropriate voltage level in accordance with the periods of the time-divisional signal. In addition, the voltage signal VN is set in the same voltage level as that of the voltage signal VP, for example, in the ground potential during the reset periods. The output voltage signal VP of the buffer 115 is applied to the fixed electrode 12, and the output voltage signal VN of the inversion buffer 116 is applied to the fixed electrode 13.

The frames 16 and 17 of this MEMS electrostatic capacitor type acceleration sensor and the like are fixed on the surface of a measurement object body in such a way that the frames 16 and 17 and the like move in conjunction with the measurement object body the acceleration of which is to be measured. When an acceleration signal "a" is applied to the measurement object body, the frames 16 and 17 and the like due to a vibration or the like, an inertial force "$-m*a$", the direction of which is opposite to that of the acceleration signal and the magnitude of which is equal to the product of the mass of the movable electrode 11 and the magnitude of the acceleration signal, is applied to the movable electrode 11 that also plays a role of a mass.

Furthermore, a gravitational force "$m*g*\cos\theta$" is also applied to the movable electrode 11, where m is the mass of the movable electrode 11, g is gravitational acceleration and equal to 9.8 m/s$^2$, and $\theta$ is an angle between the vibration direction of the movable electrode 11 (an up-down direction shown in FIG. 1) and the vertical direction. Hereinafter, the sum of the inertial force and the gravitational force applied to the movable electrode 11, that is to say, "$m*(-a+g*\cos\theta)$" will be referred to as an "external force".

As described above, when the acceleration signal is applied to the MEMS electrostatic capacitor type acceleration sensor, the external force is applied to the movable electrode 11, and the movable electrode 11 is displaced, so that the capacitance variation $\Delta C$ is generated. The displacement is generated in such a way that the elastic forces generated by the springs 14 and 15 balances with the external force. The detection circuit 18 detects the capacitance variation $\Delta C$, and the control circuit 110 generates a servo signal on the basis of the detection result in such a way that the capacitance variation $\Delta C$ approaches zero, and the detection circuit 18 applies the servo signal to the fixed electrode 12 and the fixed electrode 13 to exert an electrostatic force on the movable electrode 11. With this, not only the external force that has been applied to the movable electrode 11, but also the electrostatic force is applied to the movable electrode 11 in such a way that the electrostatic force cancels the external force.

In the case where this electrostatic force has not become equal to the external force applied to the movable electrode 11, the displacement of the movable electrode 11 and the capacitance variation $\Delta C$ are generated in such a way that a difference between the two forces and the elastic forces generated by the springs 14 and 15 balance with each other. Subsequently, the detection of this capacitance variation $\Delta C$ and the generation and application of the servo signal are repeated as mentioned above, so that a steady state where the external force applied to the movable electrode 11 balances with the electrostatic force is reached. At this point in time, since the elastic forces can be zero, the amount of the displacement of the movable electrode 11 is zero, in other words, the movable electrode 11 is held at the center between the fixed electrode 12 and the fixed electrode 13.

As described above, since the external force that is corresponding to the input acceleration signal and that is applied to the movable electrode 11 balances with the electrostatic force in the steady state, the servo signal generating the electrostatic force is corresponding to the input acceleration signal. Therefore, the servo signal can be considered as the output signal of the MEMS electrostatic capacitor type acceleration sensor. Here, since the servo signal includes unnecessary components other than an input acceleration signal component, the servo signal from which the unnecessary components are suppressed by a digital filter (not shown) becomes a final output.

Since this MEMS electrostatic capacity type acceleration sensor includes only one pair of the fixed electrode 12 and the fixed electrode 13, as shown in the above-described explanations and the operation time chart in FIG. 3, the reset, the acceleration detection, and the servo control are respectively performed in a time-divisional way. During the acceleration signal detection period, the voltage signals VP and VN work as differential carrier signals respectively. In other words, since these differential carrier signals are applied to the fixed electrodes 12 and 13 respectively, a charge signal equivalent to the products of the capacitance variation $\Delta C$ and the carrier signal is generated on the movable electrode 11, and the detection circuit 18 performs pieces of processing such as amplification on this charge signal.

Since the charge signal locally exists in a frequency band in the vicinity of the carrier signal frequency, even if low-frequency 1/f noises and a DC offset voltage are added in the detection circuit 18, the charge signal is not affected by the low-frequency 1/f noises and the DC offset voltage. The demodulator 19 multiplies the charge signal by the carrier signal, so that the charge signal is brought back to the original signal corresponding to the capacitance variation ΔC. In addition, the carrier signal to be multiplied in the demodulator 19 is delayed by a time equal to a delay time, which the charge signal is given by the detection circuit 18, in the delay device 111, so that the synchronization of a timing is taken.

Here, in the demodulator 19, unnecessary components are suppressed by a filter after the multiplication. The control circuit 110 generates the 1-bit servo signal on the basis of a signal corresponding to the capacitance variation ΔC, and the 1-bit servo signal is applied to the fixed electrodes 12 and 13 during the successive servo control period. The above-mentioned acceleration signal detection and the servo control are alternately repeated with the reset operation therebetween.

In this MEMS electrostatic capacitor type acceleration sensor, however, as shown by "T/3" shown in the operation time chart in FIG. 3, both acceleration signal detection period and servo control period are shortened to one third of T. Here, T is defined as the update interval of the servo signal. Therefore, since it becomes necessary to run the detection circuit 18 and the control circuit 110 at three times as fast as normal, power consumptions at the detection circuit 18 and the control circuit 110 increase. Furthermore, in order to secure a predefined electrostatic force by applying voltages during the short periods, as shown in FIG. 3, it is necessary to make the voltage levels of the voltage signals VP and VN higher during the servo control periods. Therefore, charge-discharge power consumptions at the pair of MEMS capacitors and parasitic capacitors increase.

As described above, there is a problem in that the total power consumption at the MEMS electrostatic capacitor type acceleration sensor according to the related technology 1 increases.

Figure 2:
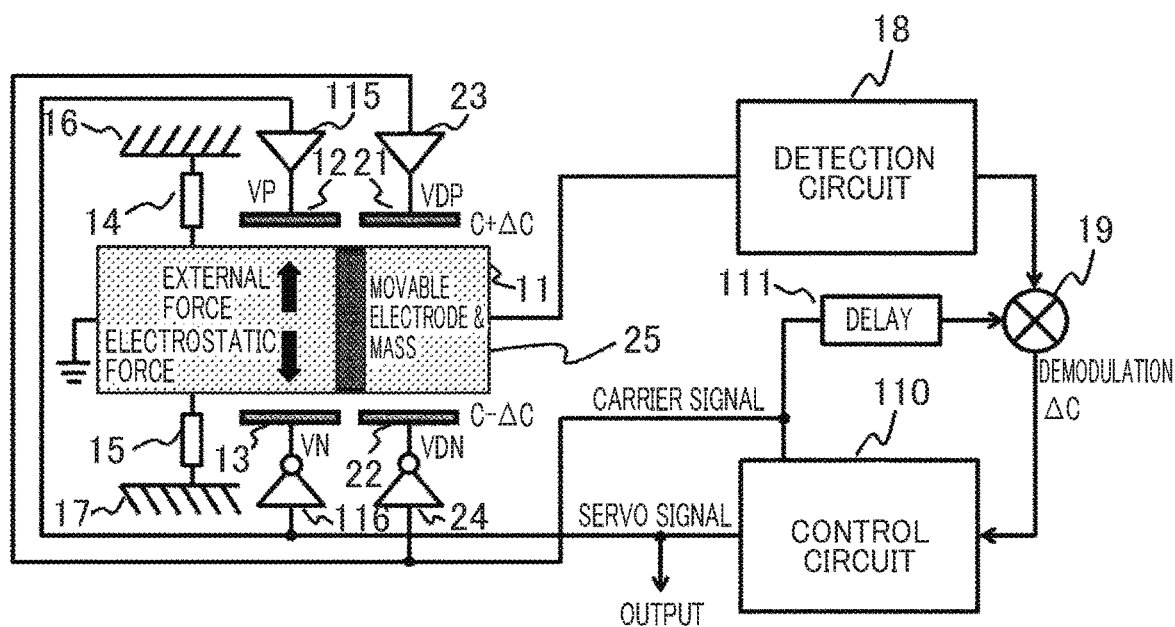
FIG. 2 is a diagram for explaining a MEMS electrostatic capacitor type acceleration sensor according to a related technology 2.

With reference to FIG. 2, a MEMS electrostatic capacitor type acceleration sensor according to a related technology 2 will be explained.

A movable electrode 11 of the MEMS electrostatic capacitor type acceleration sensor according to the related technology 2 is separated into right and left by an inserted insulating layer 25. The MEMS electrostatic capacitor type acceleration sensor includes: a first pair of MEMS capacitors composed of a left side part of the movable electrode 11, a fixed electrode 12 and a fixed electrode 13; and a second pair of MEMS capacitors composed of a right side part of the movable electrode 11, a fixed electrode 21 and a fixed electrode 22. A capacitor with its capacitance value C+ΔC is formed between the right side part of the movable electrode 11 and the fixed electrode 21 and a capacitor with its capacitance value C−ΔC is formed between the right side part of the movable electrode 11 and the fixed electrode 22.

When the movable electrode 11 is located at the center between the fixed electrode 21 and the fixed electrode 22, the capacitance variation ΔC is zero, when the movable electrode 11 is located above the center, the capacitance variation ΔC has a positive value, and when the movable electrode 11 is located below the center, the capacitance variation ΔC has a negative value. In addition, one end of a spring 14 is connected to the movable electrode 11 and the other end of the spring 14 is connected to a frame 16, and one end of a spring 15 is connected to the movable electrode 11 and the other end of the spring 15 is connected to a frame 17.

When the movable electrode 11 is located at the center between the fixed electrode 21 and the fixed electrode 22, the lengths of the spring 14 and spring 15 are natural lengths, and therefore elastic forces exerted by the spring 14 and spring 15 are zero. When the movable electrode 11 is located above the center, the spring 14 contracts, and therefore the spring 14 exerts a downward elastic force on the movable electrode 11. Furthermore, the spring 15 expands, and therefore the spring 15 also exerts a downward elastic force on the movable electrode 11.

Therefore, a downward elastic force, that is a resultant force of the above two forces, is exerted on the movable electrode 11. On the other hand, when the movable electrode 11 is located below the center, the spring 14 expands, and therefore the spring 14 exerts an upward elastic force on the movable electrode 11. Furthermore, the spring 15 contracts, and therefore the spring 15 also exerts an upward elastic force on the movable electrode 11. Therefore, an upward elastic force, that is a resultant force of the above two forces, is exerted on the movable electrode 11.

The right side part of the movable electrode 11 is connected to a detection circuit 18, the output of the detection circuit 18 is connected to a demodulator 19, and a signal corresponding to the capacitance variation ΔC is obtained at the output of the demodulator 19. The output of the demodulator 19 is connected to a control circuit 110, and the control circuit 110 generates a 1-bit (binary) servo signal on the basis of the signal corresponding to the capacitance variation ΔC. In addition, the control circuit 110 also generates a carrier signal necessary for detecting the capacitance variation ΔC. The carrier signal is a pulse signal of a constant frequency. Since the carrier signal is also necessary for demodulation, it is applied to the demodulator 19 via a delay device 111.

The servo signal is input into a buffer 115 and an inversion buffer 116. The buffer 115 converts the 1-bit servo signal into a 1-bit voltage signal VP having an appropriate voltage level, and inputs the 1-bit voltage signal into the fixed electrode 12. Furthermore, the inversion buffer 116 logically inverses the 1-bit servo signal, and, as is the case with the buffer 115, the inversion buffer 116 converts the logically inversed 1-bit servo signal into a 1-bit voltage signal VN having an appropriate voltage level as a servo signal, and inputs the 1-bit voltage signal VN into the fixed electrode 13.

Here, the left side part of the movable electrode 11 is connected to a fixed potential, for example, the ground potential. On the other hand, the carrier signal is input into a buffer 23 and an inversion buffer 24. The buffer 23 converts the carrier signal into a pulse voltage signal VDP having an appropriate voltage level as a carrier signal, and applies the pulse voltage signal VDP to the fixed electrode 21. Furthermore, the inversion buffer 24 logically inverses the carrier signal, and as is the case with the buffer 23, the buffer 24 converts the logically-inverted carrier signal into a pulse voltage signal VDN having an appropriate voltage level as a carrier signal, and applies the pulse voltage signal VDN to the fixed electrode 22.

As is the case with the related technology 1 shown in FIG. 1, when an acceleration signal is applied to the MEMS electrostatic capacitor type acceleration sensor according to the related technology 2, an external force is applied to the movable electrode 11, and the movable electrode 11 is displaced, so that the capacitance variation ΔC is generated at the second pair of MEMS capacitances. The displacement is generated in such a way that the elastic forces generated by the springs 14 and 15 balance with the external force. The detection circuit 18 detects the capacitance variation ΔC. The control circuit 110 generates a servo signal on the basis of the detection result in such a way that the capacitance variation ΔC approaches zero, and applies the servo signal to the fixed electrode 12 and the fixed electrode 13 to exert an electrostatic force on the movable electrode 11. With this, not only the external force is applied to the movable electrode 11, but also the electrostatic force is applied to the movable electrode 11 in such a way that the electrostatic force cancels the external force.

In the case where this electrostatic force has not become equal to the external force applied to the movable electrode 11, the displacement of the movable electrode 11 and the capacitance variation ΔC are generated in such a way that a difference between the two forces and the elastic forces generated by the springs 14 and 15 balance with each other. Subsequently, the detection of this capacitance variation ΔC and the generation and application of the servo signal are repeated as mentioned above, so that a steady state where the external force applied to the movable electrode 11 balances with the electrostatic force is reached. At this point in time, since the elastic forces can be zero, the amount of the displacement of the movable electrode 11 is zero, in other words, the movable electrode 11 is held at the center between the fixed electrode 21 and the fixed electrode 22.

As described above, since the external force that is corresponding to the input acceleration signal and that is applied to the movable electrode 11 balances with the electrostatic force in the steady state, the servo signal generating the electrostatic force is corresponding to the input acceleration signal. Therefore, the servo signal can be considered as the output signal of the MEMS electrostatic capacitor type acceleration sensor. Here, since the servo signal includes unnecessary components other than an input acceleration signal component, the servo signal from which the unnecessary components are suppressed by a digital filter (not shown) becomes a final output.

Since this MEMS electrostatic capacitor type acceleration sensor according to the related technology 2 includes the second pair of MEMS capacitors along with the addition of the fixed electrodes 21 and 22, the first pair of MEMS capacitors can be used for the servo control and the second pair of MEMS capacitors can be used for applying the carrier signal for detecting the acceleration signal as described above. Therefore, as shown by an operation time chart in FIG. 4, the acceleration signal detection and the servo control can be performed simultaneously in parallel.

In other words, since the differential carrier signals VDP and VDN are applied to the fixed electrodes 21 and 22 respectively, a charge signal corresponding to the product of the capacitance variation ΔC and the carrier signal is generated on the right side of the movable electrode 11, and the detection circuit 18 performs pieces of processing such as amplification on this charge signal. Since the charge signal locally exists in a frequency band in the vicinity of the carrier signal frequency, even if low-frequency 1/f noises and a DC offset voltage are added in the detection circuit 18, the charge signal is not affected by the low-frequency 1/f noises and the DC offset voltage. The demodulator 19 multiplies the charge signal by the carrier signal, so that the charge signal is brought back to the original signal corresponding to the capacitance variation ΔC.

In addition, the carrier signal to be multiplied in the demodulator 19 is delayed by a time equal to a delay time, which the charge signal is given by the detection circuit 18, by the delay device 111, so that the synchronization of a timing is taken. Here, in the demodulator 19, unnecessary components are suppressed by a filter after the multiplication. The control circuit 110 generates the 1-bit servo signal on the basis of the signal corresponding to the capacitance variation ΔC, and the 1-bit servo signal is applied to the fixed electrodes 12 and 13. In the above-described operation, the insulating layer 25 plays a role to prevent the servo signal from getting mixed in the right side part of the movable electrode 11 and interfering with the charge signal.

Figure 4:
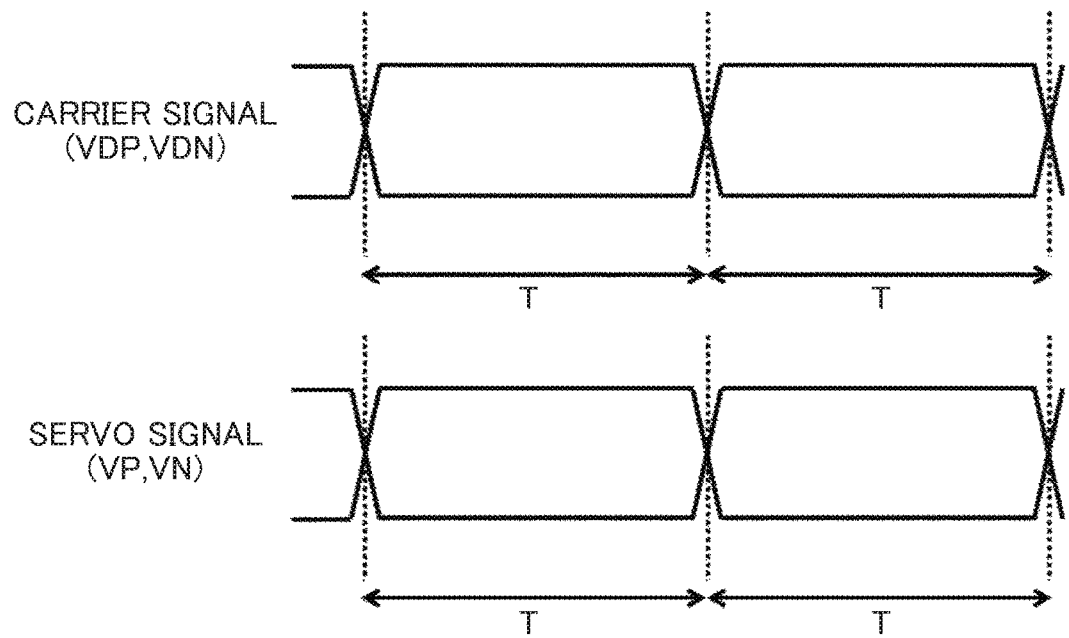
FIG. 4 is an operation time chart of the MEMS electrostatic capacitor type acceleration sensor according to the related technology 2.

In this MEMS electrostatic capacitor type acceleration sensor according to the related technology 2, since the acceleration signal detection and the servo control are performed simultaneously in parallel, either of the acceleration signal detection period and the servo control period is not shortened as shown by "T" in the operation time chart in FIG. 4. Therefore, the detection circuit 18 and the control circuit 110 can be run in low speeds, so that powers consumed by these circuits can be reduced. In addition, since the servo signal can always be applied, as shown in FIG. 4, even if the 1-bit voltage signals VP and VN are set low, a predefined electrostatic force can be secured. Therefore, charge-discharge power consumptions at the pairs of MEMS capacitors and parasitic capacitors can be reduced.

However, in this MEMS electrostatic capacitor type acceleration sensor according to the related technology 2, the structures of the MEMS elements become large-sized and complicated, therefore there is a problem in that the reduction of the manufacturing costs and the reduction of the variations of electrical and mechanical characteristics of the MEMS elements become difficult.

With the above-described problems existing in the related technologies 1 and 2 in mind, MEMS electrostatic capacitor type acceleration sensors according to the embodiments of the present invention are designed in such a way that a 1-bit servo signal is also used as a carrier signal, so that both acceleration signal detection and servo control are performed simultaneously in parallel using only one pair of MEMS capacitors.

With this, in the after-mentioned embodiments, it becomes possible to realize low-noise and low-power-consumption MEMS electrostatic capacitor type acceleration sensors, and at the same time, it becomes possible to reduce the manufacturing costs of the MEMS elements and the variations of the electric and mechanical characteristics of the MEMS elements.

Hereinafter, the embodiments of the present invention will be explained with reference to the accompanying drawings.

First Embodiment

The configuration of a MEMS electrostatic capacitor type acceleration sensor according to a first embodiment will be explained with reference to FIG. 5.

Figure 5:
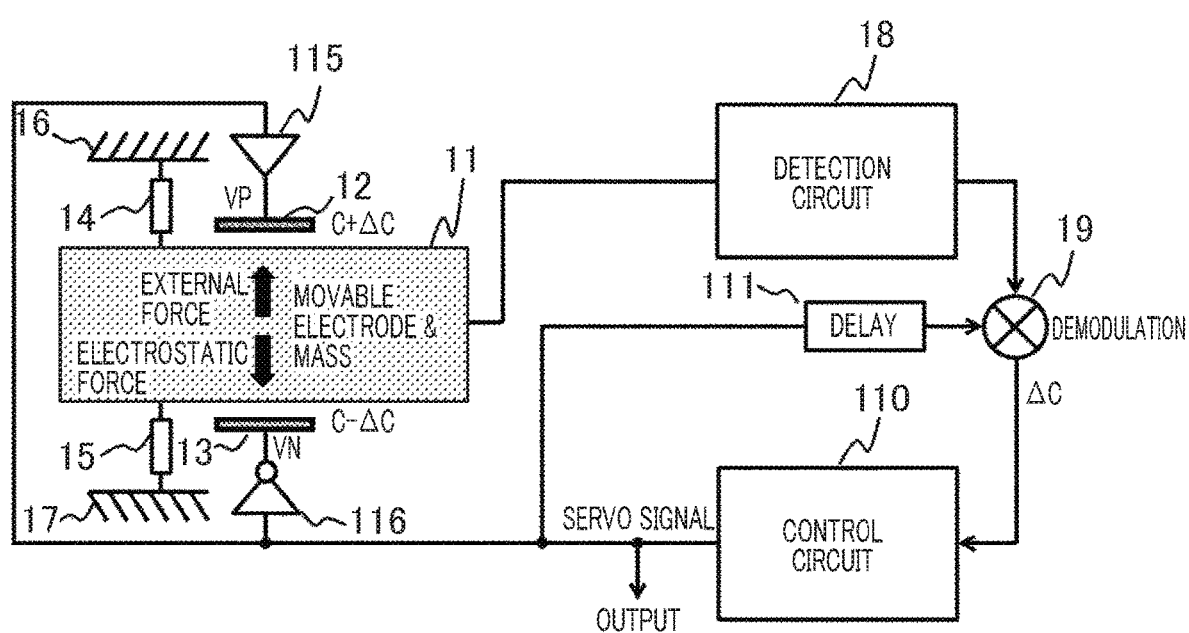
FIG. 5 is a diagram for explaining a MEMS electrostatic capacitor type acceleration sensor according to a first embodiment.

As shown in FIG. 5, the MEMS electrostatic acceleration sensor according to the first embodiment includes a pair of MEMS capacitors composed of a movable electrode 11 that also plays a role of a mechanical mass, a fixed electrode 12, and a fixed electrode 13. Therefore, a capacitor with its capacitance value C+ΔC is formed between the movable electrode 11 and the fixed electrode 12, and a capacitor with its capacitance value C−ΔC is formed between the movable electrode 11 and the fixed electrode 13.

When the movable electrode 11 is located at the center between the fixed electrode 12 and the fixed electrode 13, a capacitance variation ΔC becomes zero, when the movable electrode 11 is located above the center, the capacitance variation ΔC has a positive value, and when the movable electrode 11 is located below the center, the capacitance variation ΔC has a negative value. In addition, one end of a spring 14 is connected to the movable electrode 11 and the other end is connected to a frame 16, and one end of a spring 15 is connected to the movable electrode 11 and the other end is connected to a frame 17. When the movable electrode 11 is located at the center between the fixed electrode 12 and the fixed electrode 13, the lengths of the spring 14 and spring 15 are natural lengths, and therefore elastic forces exerted by the spring 14 and spring 15 are zero. When the movable electrode 11 is located above the center, the spring 14 contracts, and therefore the spring 14 exerts a downward elastic force on the movable electrode 11.

Furthermore, the spring 15 expands, and therefore the spring 15 also exerts a downward elastic force on the movable electrode 11. Therefore, a downward elastic force, that is a resultant force of the above two forces, is exerted on the movable electrode 11. On the other hand, when the movable electrode 11 is located below the center, the spring 14 expands, and therefore the spring 14 exerts an upward elastic force on the movable electrode 11. Furthermore, the spring 15 contracts, and therefore the spring 15 also exerts an upward elastic force on the movable electrode 11. Therefore, an upward elastic force, that is a resultant force of the above two forces, is exerted on the movable electrode 11.

The movable electrode 11 is connected to a detection circuit 18, the output of the detection circuit 18 is connected to a demodulator 19, and a signal corresponding to the capacitance variation ΔC is obtained at the output of the demodulator 19. The output of the demodulator 19 is connected to a control circuit 110, and the control circuit 110 generates a 1-bit (binary) servo signal on the basis of the signal corresponding to the capacitance variation ΔC. The 1-bit servo signal is input into a buffer 115 and an inversion buffer 116. In addition, the 1-bit servo signal is applied to the demodulator 19 via a delay device 111.

The buffer 115 converts the 1-bit servo signal into a voltage signal VP having an appropriate voltage level as a servo signal and a carrier signal. On the other hand, the inversion buffer 116 logically inverses the 1-bit servo signal, and, as is the case with the buffer 115, the inversion buffer 116 converts the logically inverted servo signal into a voltage signal VN having an appropriate voltage level as a servo signal and carrier signal. The output voltage signal VP of the buffer 115 is applied to the fixed electrode 12, and the output voltage signal VN of the inversion buffer 116 is applied to the fixed electrode 13.

As is the case with the related technology 1 in FIG. 1, when an acceleration signal is applied to the MEMS electrostatic capacitor type acceleration sensor of this first embodiment, an external force is applied to the movable electrode 11, and the movable electrode 11 is displaced, so that the capacitance variation ΔC is generated. The displacement is generated in such a way that the elastic forces generated by the springs 14 and 15 balances with the external force. The detection circuit 18 detects the capacitance variation ΔC, and the control circuit 110 generates a servo signal on the basis of the detection result in such a way that the capacitance variation ΔC approaches zero, and the detection circuit 18 applies the servo signal to the fixed electrode 12 and the fixed electrode 13 to exert an electrostatic force on the movable electrode 11. With this, not only the external force that has been applied to the movable electrode 11, but also the electrostatic force is applied to the movable electrode 11 in such a way that the electrostatic force cancels the external force.

In the case where this electrostatic force has not become equal to the external force applied to the movable electrode 11, the displacement of the movable electrode 11 and the capacitance variation ΔC are generated in such a way that a difference between the two forces and the elastic forces generated by the springs 14 and 15 balance with each other. Subsequently, the detection of this capacitance variation ΔC and the generation and application of the servo signal are repeated as mentioned above, so that a steady state where the external force applied to the movable electrode 11 balances with the electrostatic force is reached. At this point in time, since the elastic forces can be zero, the amount of the displacement of the movable electrode 11 is zero, in other words, the movable electrode 11 is held at the center between the fixed electrode 12 and the fixed electrode 13.

As described above, since the external force that is corresponding to the input acceleration signal and that is applied to the movable electrode 11 balances with the electrostatic force in the steady state, the servo signal generating the electrostatic force is corresponding to the input acceleration signal. Therefore, the servo signal can be considered as the output signal of the MEMS electrostatic capacitor type acceleration sensor. Here, since the servo signal includes unnecessary components other than an input acceleration signal component, the servo signal from which the unnecessary components are suppressed by a digital filter (not shown) becomes a final output.

This MEMS electrostatic capacitor type acceleration sensor according to the first embodiment is different from the MEMS electrostatic capacitor type acceleration sensor according to the related technologies 1 or 2 shown in FIG. 1 and FIG. 2 respectively, and the MEMS electrostatic capacitor type acceleration sensor according to the first embodiment of the present invention is designed in such a way that the 1-bit servo signal is also used as the carrier signal. Since the MEMS electrostatic capacitor type acceleration sensor according to the first embodiment is provided with only one pair of the fixed electrodes 12 and 13, as mentioned above, the differential servo voltage signals VP and VN are applied to these electrodes respectively. At this point in time, attention is paid on a fact that a charge signal corresponding to the product of the capacitance variation ΔC and the 1-bit servo signal is generated on the movable electrode 11. The detection circuit 18 performs pieces of processing such as amplification on this charge signal. Since the 1-bit servo signal includes sufficient amounts of high-frequency components caused by 1-bit quantization, the charge signal includes sufficient information in its high-frequency components. Therefore, even if low-frequency 1/f noises and a DC offset voltage are added in the detection circuit 18, the charge signal is not easily affected by the low-frequency 1/f noises and the DC offset voltage. The demodulator 19 multiplies the charge signal by the servo signal to calculate correlation between the charge signal and the servo signal, so that the charge signal is brought back to the original signal corresponding to the capacitance variation ΔC.

For example, if the servo signal is "1 −1 1 1 −1 1 −1 −1 1 . . . ", the charge signal is "ΔC −ΔC ΔC ΔC −ΔC ΔC −ΔC −ΔC ΔC . . . ", and the charge signal is multiplied by the servo signal "1 −1 1 1 −1 1 −1 −1 1 . . . " in the demodulator 19, so that the charge signal becomes "ΔC −ΔC ΔC ΔC −ΔC ΔC −ΔC −ΔC ΔC . . . ".

Here, the servo signal to be multiplied in the demodulator 19 is delayed by a time equal to a delay time, which the charge signal is given by the detection circuit 18, by the delay device 111, so that the synchronization of a timing is taken. Furthermore, in the demodulator 19, unnecessary components are suppressed by a filter after the multiplication. The control circuit 110 generates the 1-bit servo signal on the basis of a signal corresponding to the capacitance variation ΔC, and the 1-bit servo signal is applied to the fixed electrodes 12 and 13.

Figure 6:
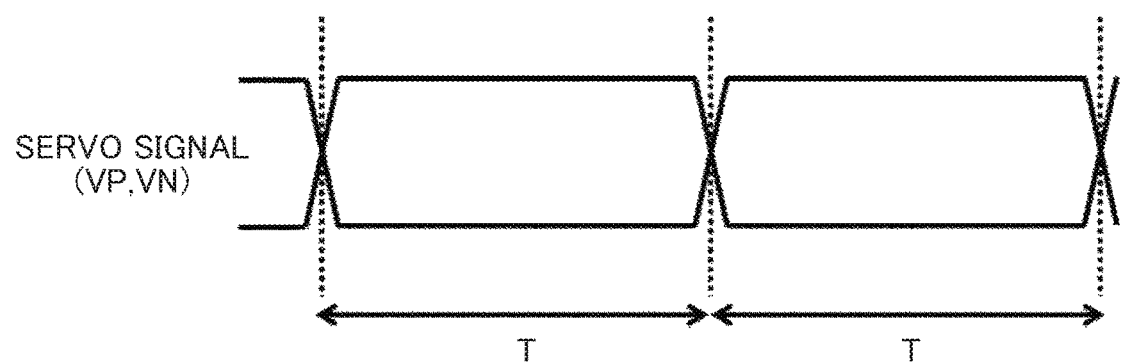
FIG. 6 is an operation time chart of the MEMS electrostatic capacitor type acceleration sensor according to the first embodiment.

The operation of the MEMS electrostatic capacitor type acceleration sensor according to the first embodiment will be explained with reference to FIG. 6. Since both acceleration signal detection and servo control are performed simultaneously in parallel, either of the acceleration signal detection period and the servo control period is not shortened as shown by "T" in an operation time chart in FIG. 6. Therefore, the detection circuit 18 and the control circuit 110 can be run in low speeds, so that powers consumed by these circuits can be reduced. In addition, since the servo signal can always be applied, as shown in FIG. 6, even if the 1-bit voltage signals VP and VN are set low, a predefined electrostatic force can be secured. Therefore, charge-discharge power consumptions at the pair of MEMS capacitors and parasitic capacitors can be reduced. Furthermore, the structures of the MEMS elements can be small-sized and simple, not only the reduction of the manufacturing costs, but also the reduction of the variations of electrical and mechanical characteristics of the MEMS elements can be realized.

Second Embodiment

Figure 7:
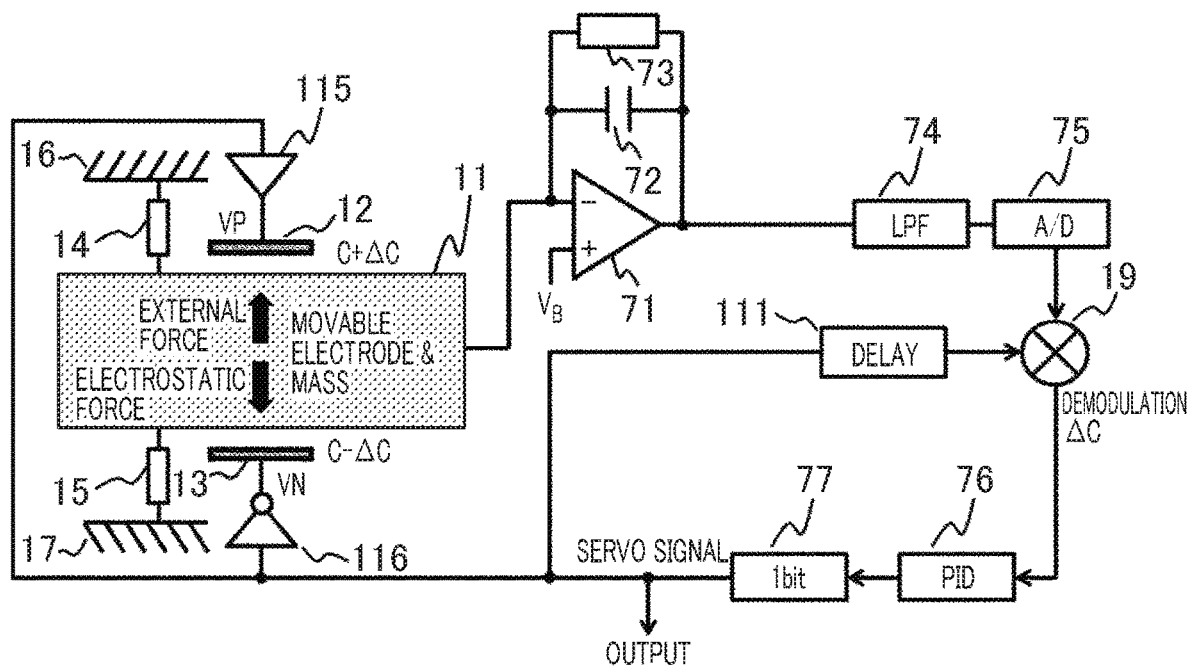
FIG. 7 is a diagram for explaining a MEMS electrostatic capacitor type acceleration sensor according to a second embodiment.

The configuration of a MEMS electrostatic capacitor type acceleration sensor according to a second embodiment will be explained with reference to FIG. 7.

In the second embodiment, the concrete examples of the detection circuit 18 and the control circuit 110 used in the first embodiment will be disclosed. Since the way and advantageous effects of the operation of the second embodiment are the same as those of the operation of the first embodiment, explanations thereof will be omitted.

In the second embodiment, a detection circuit 18 includes: a C/V conversion amplifier composed of an operational amplifier 71, a capacitance element 72, and a resistance element 73; a lowpass filter 74 connected to the output of the C/V conversion amplifier, and an A/D converter 75 connected to the output of the lowpass filter 74. The configuration of the C/V conversion amplifier is a configuration of a so-called Op-amp negative feedback type inversion amplifier, and the C/V conversion amplifier converts a charge signal into a voltage signal using the capacitance element 72 that is a feedback capacitor.

Here, the resistance element 73 having a high resistance value is provided in parallel with the capacitance element 72. With this, a current feed route for compensating a leakage current flowing into the inversion input node of the operational amplifier 71 is secured, and the output DC potential of the C/V conversion amplifier is kept optimal. On the other hand, although a circuit in which a switch is used instead of the resistance element 73 has conventionally been well-known, larger noises are generated in this case than in the case of using the resistance element 73 owing to sampling noises generated by the switch.

Since a thermal noise generated by the resistance element 73 having a high resistance value is suppressed by the characteristic of a lowpass filter composed of the resistance element 73 and the capacitance element 72, the thermal noise does not affect the high-frequency components of the charge signal that plays an important role in the MEMS acceleration sensor according to the present invention. The A/D converter 75 is prepared for converting the voltage signal output from the C/V conversion amplifier into a digital value. With this, since a multiplier and a filter of a demodulator 19, and the control circuit 110 can be realized using digital circuits, the robust operation of the MEMS electrostatic capacitor type sensor, which is not easily affected by the variations of PVT (process, power supply voltage, temperature), can be realized.

The lowpass filter 74 is disposed before the A/D converter 75 as an antialiasing filter for controlling sampling aliasing noises generated by the A/D converter 75. In an example of the operation time chart in FIG. 6, the A/D converter 75 converts the voltage signal output from the C/V conversion amplifier into a digital value at a conversion speed 1/T, and both demodulator 19 and control circuit 110 operate at the operation speed 1/T. In addition, the cutoff frequency of the lowpass filter 74 is set to, for example, 1/(2T). Here, it is conceivable that an additional amplifier is disposed between the C/V conversion amplifier and the lowpass filter 74 or between the lowpass filter 74 and the A/D converter 75. The influence of the conversion error of the A/D converter 75 is further alleviated, as the total gain given by the C/V conversion amplifier and the additional amplifier disposed before the A/D converter 75 becomes larger.

The control circuit 110 according to the second embodiment includes a PID control circuit 76 and a 1-bit quantizer 77. The PID control circuit 76 executes the calculation of PID (Proportional-Integral-Differential) control such as integration on the basis of a signal corresponding to the capacitance variation ΔC obtained at the output of the demodulator 19, and calculates a servo control value. The 1-bit quantizer 77 outputs "+1" if the servo control value is positive (or nonnegative), and outputs "−1" if the servo control value is negative.

Furthermore, the output voltage signal VP of the buffer 115 becomes H (High) voltage in the operation time chart in FIG. 6 when the output of the 1-bit quantizer 77 is "+1", and L (Low) voltage when the output of the 1-bit quantizer 77 is "−1". On the other hand, the output voltage signal VN of the inversion buffer 116 becomes L (Low) voltage when the output of the 1-bit quantizer 77 is "+1", and H (High) voltage when the output of the 1-bit quantizer 77 is "−1". Quantization errors associated with the operation of the abovementioned 1-bit quantizer 77 become the high-frequency components of the 1-bit servo signal, and this fact supports the operation principle of the present invention.

Figure 8:
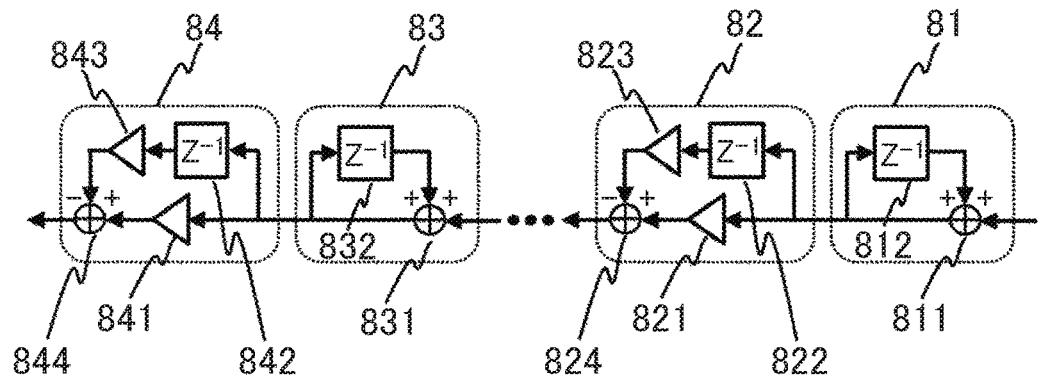
FIG. 8 is a diagram for supplementarily explaining the second embodiment.

The configuration and operation of the PID control circuit 76 will be explained with reference to FIG. 8.

A configuration, in which, after the output of an adder 811 is delayed by a 1-clock period by a 1-sample delay device 812, the delayed output is added to an input by the adder 811, forms a no-delay integrator 81. In addition, using a subtractor 824, a zero-point generator 82 calculates a difference between a signal obtained by amplifying an input by a digital gain 821 and a signal obtained by delaying the input by a 1-clock period by a 1-sample delay device 822 and amplifying the delayed input by a digital gain 823. In order to realize a gain a and a zero-point frequency $f_z$ in the zero-point generator 82, that is, in order to realize a transfer function $a*\{1+s/(2\pi*f_z)\}$, the gain of the digital gain 821 is set to $a*\{1+1/(2\pi*f_z*T)\}$, and the gain of the digital gain 823 is set to $a/(2\pi*f_z*T)$.

The no-delay integrator provides an integration operation that plays a central role of the PID control. Furthermore, the zero-point generator is necessary for stabilizing the PID control. As shown in FIG. 8, integration is executed n times by serially connecting "n" no-delay integrators (where "n" is a number of no-delay integrators), so that n-order PID control is realized. In addition, the stability of the PID control is secured by serially connecting plural zero-point generators. Here, it is not always necessary that the number of the serially-connected zero-point generators is equal to the number of the serially-connected no-delay integrators. Furthermore, since the PID control circuit 76 includes plural digital gains, it is conceivable that the loop gain of the servo control is appropriately adjusted.

Third Embodiment

Figure 9:
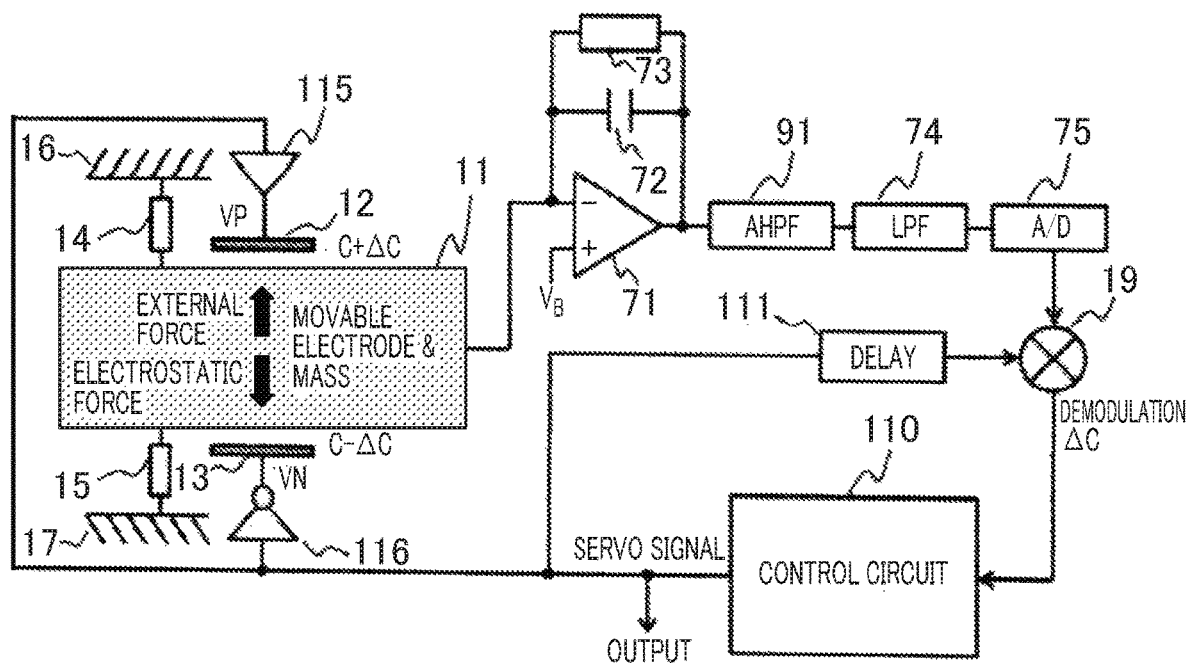
FIG. 9 is a diagram for explaining a MEMS electrostatic capacitor type acceleration sensor according to a third embodiment.

The configuration of a MEMS electrostatic capacitor type acceleration sensor according to a third embodiment will be explained with reference to FIG. 9.

The third embodiment is an embodiment obtained by inserting an analog highpass filter 91 in the detection circuit 18 in the first embodiment. A charge signal is amplified by a C/V conversion amplifier and other amplifiers, the amplified charge signal is converted into a signal having a digital value by an A/D converter 75, and the signal having the digital value are multiplied by a 1-bit servo signal in a demodulator 19. On this occasion, 1/f noises and a DC offset voltage added to the charge signal ion the detection circuit 18 are also multiplied by the 1-bit servo signal.

Since the 1-bit servo signal includes not only high-frequency quantization error components, but also a DC component and low-frequency components corresponding to an input acceleration signal, the 1/f noises and the DC offset voltage are multiplied by the DC component and the low-frequency components in the modulator 19, so that low-frequency noise components are generated at the output of the demodulator 19.

Therefore, in the third embodiment, by suppressing the 1/f noises and the DC offset voltage, which are generated at the C/V conversion amplifier and added to the charge signal, using the analog highpass filter 91 inserted in a stage after the C/V conversion amplifier, the generation of the low-frequency noise components are controlled. Here, it is conceivable that the analog highpass filter 91 is inserted in an arbitrary place, for example, in a stage after the A/D converter 75. In this case, 1/f noises and a DC offset voltage, which are generated in the C/V conversion amplifier, the lowpass filter 74, and the A/D converter 75 and added to the charge signal, are suppressed, so that the generation of the low-frequency noise components can be controlled.

In addition, analog highpass filters can be inserted in plural places in the detection circuit 18. Furthermore, additional amplifiers can be inserted between the C/V conversion amplifier and the lowpass filter 74, or between the lowpass filter 74 and the A/D converter 75, and an analog highpass filter can be inserted between any two adjacent additional amplifiers.

Fourth Embodiment

Figure 10:
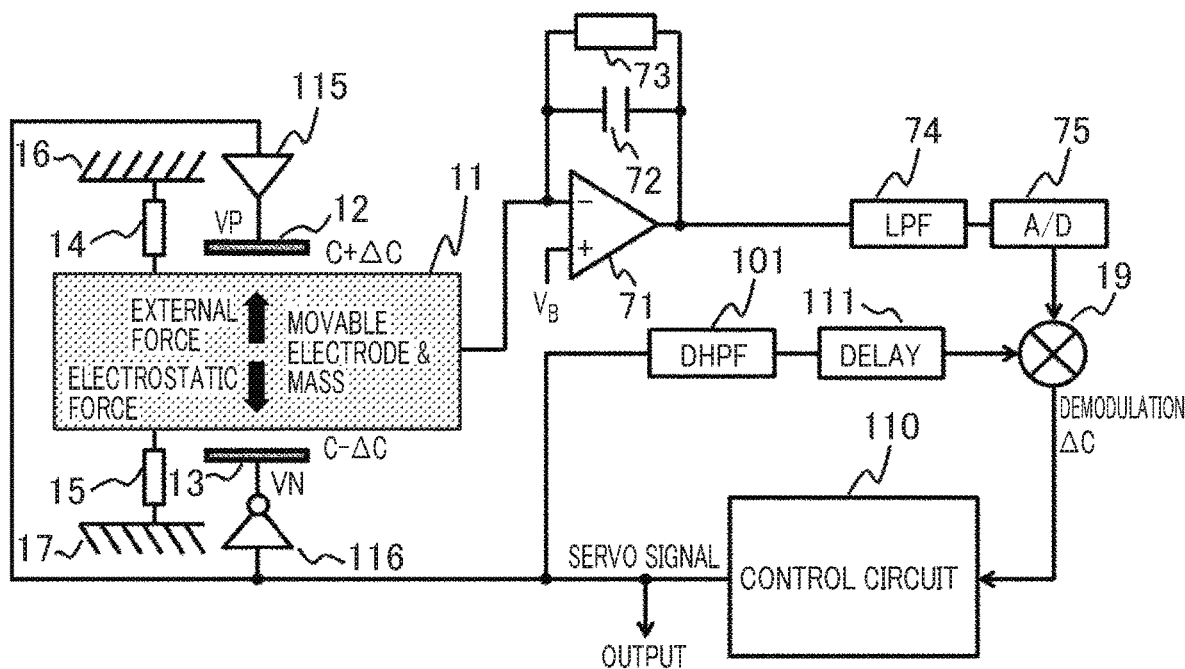
FIG. 10 is a diagram for explaining a MEMS electrostatic capacitor type acceleration sensor according to a fourth embodiment.

The configuration of a MEMS electrostatic capacitor type acceleration sensor according to a fourth embodiment will be explained with reference to FIG. 10.

In the fourth embodiment, a highpass filter is used for processing a servo signal to be multiplied in a demodulator 19 unlike the third embodiment in which the highpass filter is inserted in the detection circuit.

A charge signal is amplified by a C/V conversion amplifier and other amplifiers, the amplified charge signal is converted into a signal having a digital value by an A/D converter 75, and the signal having the digital value are multiplied by a 1-bit servo signal in a demodulator 19. On this occasion, 1/f noises and a DC offset voltage added to the charge signal in the detection circuit 18 are also multiplied by the 1-bit servo signal. Since the 1-bit servo signal includes not only high-frequency quantization error components, but also a DC component and low-frequency components corresponding to an input acceleration signal, the 1/f noises and the DC offset voltage are multiplied by the DC component and the low-frequency components in the modulator 19, so that low-frequency noise components are generated at the output of the demodulator 19.

Therefore, in the fourth embodiment, by suppressing the DC component and the low-frequency components corresponding to the input acceleration signal included in the 1-bit servo signal using a digital highpass filter 101, the generation of the low-frequency noise components are controlled. Here, it is conceivable that the digital highpass filter 101 is inserted in a stage after a delay device 111.

Fifth Embodiment

Figure 11:
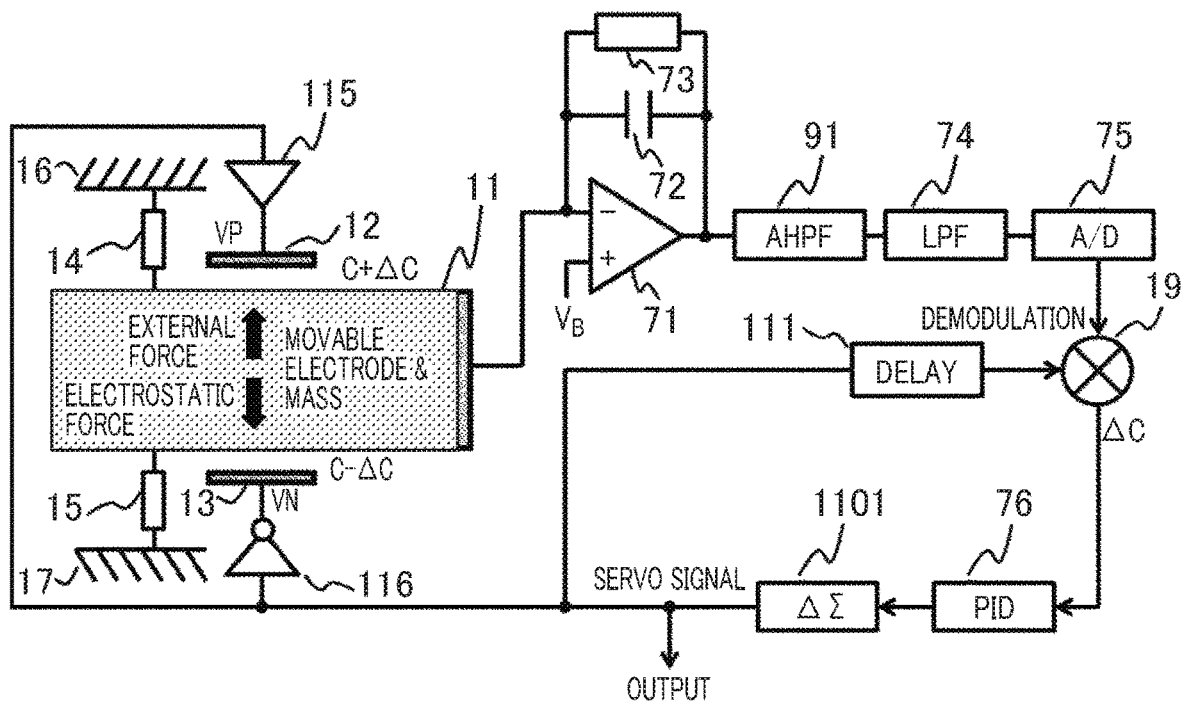
FIG. 11 is a diagram for explaining a MEMS electrostatic capacitor type acceleration sensor according to a fifth embodiment.

The configuration of a MEMS electrostatic capacitor type acceleration sensor according to a fifth embodiment will be explained with reference to FIG. 11.

The fifth embodiment has a configuration in which the 1-bit quantizer 77 is replaced with a delta-sigma modulator 1101 in the second embodiment.

The delta-sigma modulator 1101 converts a servo control value output from a PID control circuit 76 into a binary signal that is pulse-density-modulated and that has a value +1 or −1. The output voltage signal VP of a buffer 115 becomes H (High) shown in the operation time chart in FIG. 6 when the output of the delta-sigma modulator 1101 is +1, and L (Low) when the output of the delta-sigma modulator 1101 is −1. On the other hand, the output voltage signal VN of an inversion buffer 116 becomes L (Low) shown in the operation time chart in FIG. 6 when the output of the delta-sigma modulator 1101 is +1, and H (High) when the output of the delta-sigma modulator 1101 is −1.

Although both 1-bit quantizer 77 adopted in the second embodiment and delta-sigma modulator 1101 adopted in the fifth embodiment generate 1-bit servo signals including sufficient amounts of high-frequency components respectively, the 1-bit servo signal generated by the latter includes larger amounts of high-frequency components, and therefore the latter is more suitable for the operation of the present invention. Since the operation and advantageous effects of the fifth embodiment are the same as those of the first embodiment, explanations thereof will be omitted.

Figure 12:
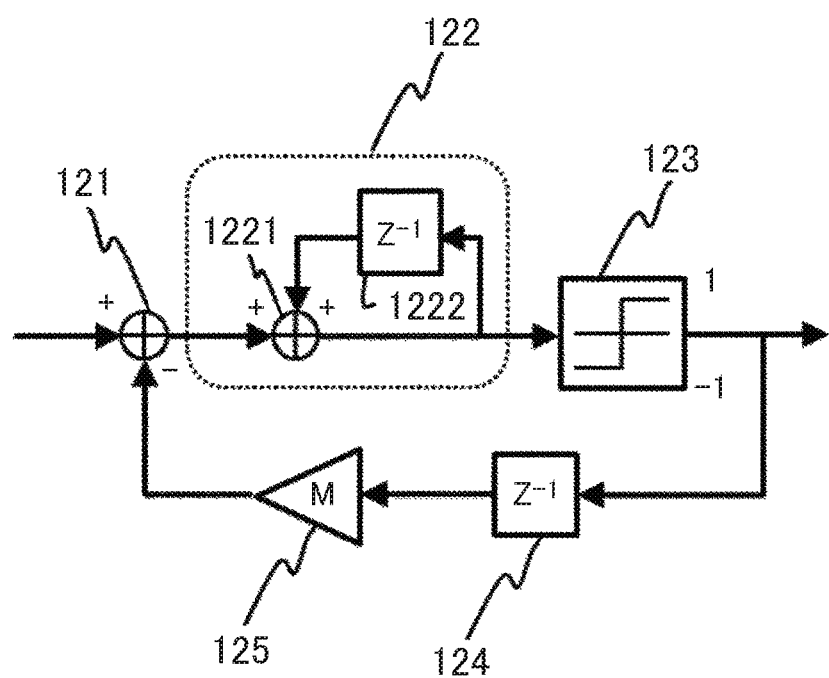
FIG. 12 is another diagram for supplementarily explaining the fifth embodiment.

As an example of the delta-sigma modulator, an example of the configuration and operation of a first-order delta-sigma modulator will be explained 1101 with reference to FIG. 12.

A configuration, in which, after the output of an adder 1221 is delayed by a 1-clock period by a 1-sample delay device 1222, the delayed output is added to an input by the adder 1221, forms a no-delay integrator 122. A signal obtained by integrating the output of the adder 1221 by the no-delay integrator 122 is input into a 1-bit quantizer 123, and it is binarized into +1 or −1 depending on whether the value of the signal is positive or negative. The output of the 1-bit quantizer 123 becomes the output of the first-order delta-sigma modulator. In addition, after being delayed by a 1-clock period by a 1-sample delay device 124, the output of the 1-bit quantizer 123 is M times amplified by a digital gain 125.

The M times amplified signal is subtracted from an input signal in a subtractor 121, so that a negative feedback loop is formed. The output of the first-order delta-sigma modulator becomes a binary signal that is obtained by pulse-density-modulating the input signal and that has a value +1 or −1. As stated above, the binarization is executed in the 1-bit quantizer 123, and on this occasion, quantization errors are generated. Thorough the workings of the one integration executed by the no-delay integrator 122 and the negative feedback control, components caused by the quantization errors massively appear in a high-frequency range in the vicinity of a Nyquist frequency (=1/(2T)) at the output of the first-order delta-sigma modulator.

Therefore, the output of the first-order delta-sigma modulator is a 1-bit (binary) signal including sufficient amounts of high-frequency components, so that the output of the first-order delta-sigma modulator is suitable for the operation of the present invention. Here, the input signal range that can be treated by the first-order delta-sigma modulator becomes approximately ±M owing to the digital gain 125 with its gain M shown in FIG. 12. Therefore, the value of M is appropriately set in consideration of the amplitude range of the servo control value output by the PID control circuit 76.

An example of the configuration and operation of a second-order delta-sigma modulator will be explained as an example of the delta-sigma modulator 1101 with reference to FIG. 13.

A configuration, in which, after the output of an adder 1311 is delayed by a 1-clock period by a 1-sample delay device 1312, the delayed output is added to an input by the adder 1311, forms a no-delay integrator 131. Similarly, a configuration, in which, after the output of an adder 1331 is delayed by a 1-clock period by a 1-sample delay device 1332, the delayed output is added to an input by the adder 1331, forms a second no-delay integrator 133. The signal integrated by the no-delay integrator 131 passes through a subtractor 132, and a second integration is executed on the signal in the no-delay integrator 133.

The signal obtained on which the second integration is executed is input into a 1-bit quantizer 123, and the signal is binarized into +1 or −1 depending on whether the value of the signal is positive or negative. The output of the 1-bit quantizer 123 becomes the output of the second-order delta-sigma modulator. Furthermore, after being delayed by a 1-clock period by a 1-sample delay device 124, the output of the 1-bit quantizer 123 is M times amplified by a digital gain 125. The M times amplified signal is subtracted from an input signal in a subtractor 121, so that a negative feedback loop is formed.

In addition, the M times amplified signal is also subtracted from the output of the no-delay integrator 131 by the subtractor 132. The output of the second-order delta-sigma modulator becomes a binary signal that is obtained by pulse-density-modulating the input signal and that has a value +1 or −1. The binarization is executed in the 1-bit quantizer 123, and on this occasion, quantization errors are generated. Thorough the workings of the two integrations and the negative feedback control, components caused by the quantization errors more massively appear in a high-frequency range in the vicinity of a Nyquist frequency (=1/(2T)) at the output of the second-order delta-sigma modulator than in the case of the first-order delta-sigma modulator. Therefore, the output of the second-order delta-sigma modulator is a 1-bit (binary) signal including sufficient amounts of high-frequency components, so that the output of the second-order delta-sigma modulator is suitable for the operation of the present invention.

Figure 13:
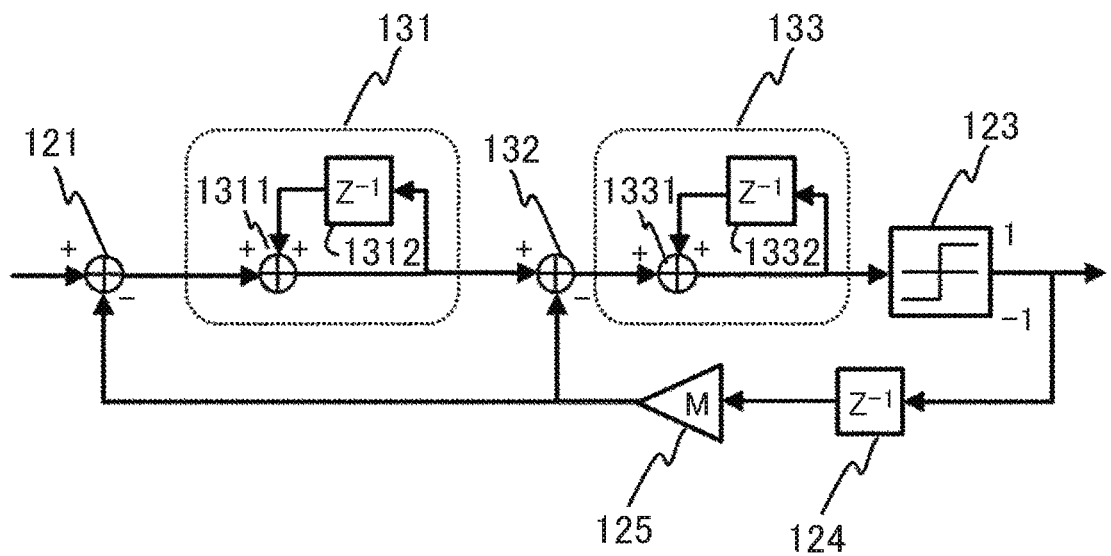
FIG. 13 is another diagram for supplementarily explaining the fifth embodiment.

Here, the input signal range that can be treated by the second-order delta-sigma modulator becomes approximately ±M owing to the digital gain 125 with its gain M shown in FIG. 13. Therefore, the value of M is appropriately set in consideration of the amplitude range of the servo control value output by the PID control circuit 76.

Figure 14:
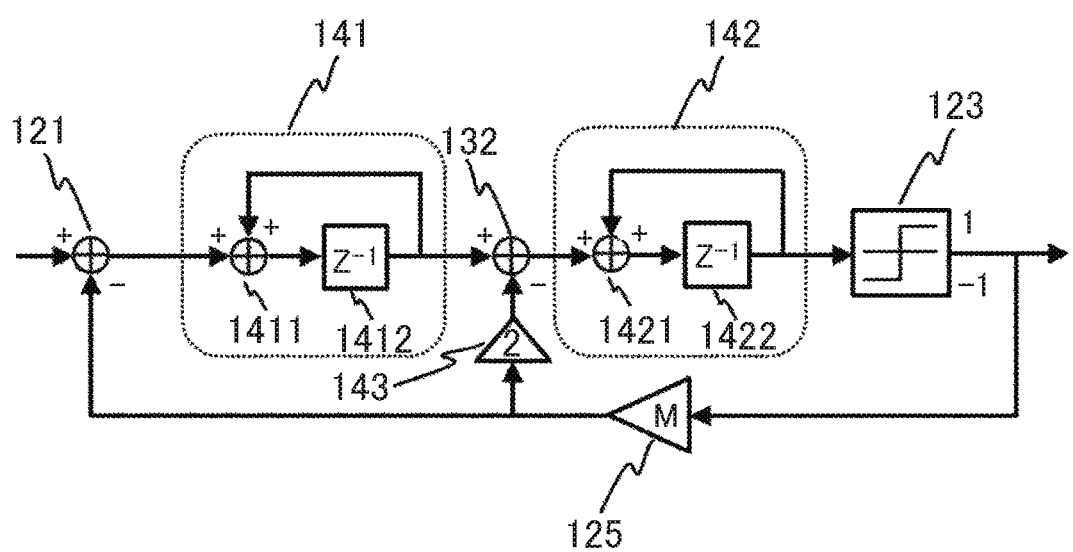
FIG. 14 is another diagram for supplementarily explaining the fifth embodiment.

Another example of the second-order delta-sigma modulator is shown in FIG. 14 as an example of the delta-sigma modulator 1101.

Two delay integrators 141 and 142 are adopted. Although the components and operations of these delay integrators are similar to those of the no-delay integrators 131 and 133, two 1-sample delay devices 1412 and 1422 are inserted in the signal paths of the two delay integrators 141 and 142 respectively, so that a signal is integrated and, at the same time, delayed by 1-clock period in each of the delay integrators 141 and 142. Furthermore, after being doubled by a digital gain 143, the output of a digital gain 125 is subtracted in a subtractor 132. The 1-sample delay device 124 shown in FIG. 13 is not necessary in this example. The abovementioned configuration changes make it possible for the second-order delta-sigma modulator shown in FIG. 14 to provide the same output as the output of the second-order delta-sigma modulator shown in FIG. 13.

Figure 15:
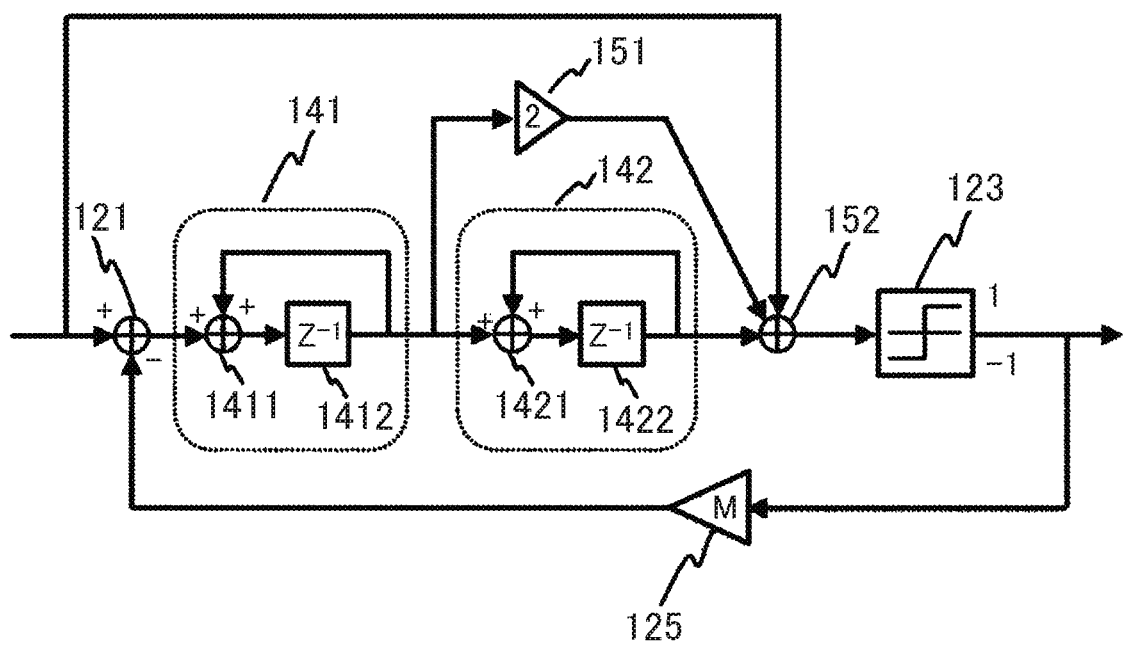
FIG. 15 is another diagram for supplementarily explaining the fifth embodiment.

Another example of the second-order delta-sigma modulator is shown in FIG. 15 as an example of the delta-sigma modulator 1101. The configuration of this example is referred to as a feedforward type configuration.

Similarly to the delta-sigma modulator shown in FIG. 14, two delay integrators 141 and 142 are adopted. In this example, the subtractor 132 shown in FIG. 13 or FIG. 14 is unnecessary, and the 1-sample delay device 124 shown in FIG. 13 is also unnecessary. Instead of these devices, an adder 152 is inserted between the delay integrator 142 and a 1-bit quantizer 123. The adder 152 adds an input signal, a signal obtained by doubling the output signal of the delay integrator 141 by a digital gain 151, and the output of the delay integrator 142. This configuration makes it possible for the second-order delta-sigma modulator shown in FIG. 15 to provide the same output as the output of the second-order delta-sigma modulator shown in FIG. 13.

Figure 16:
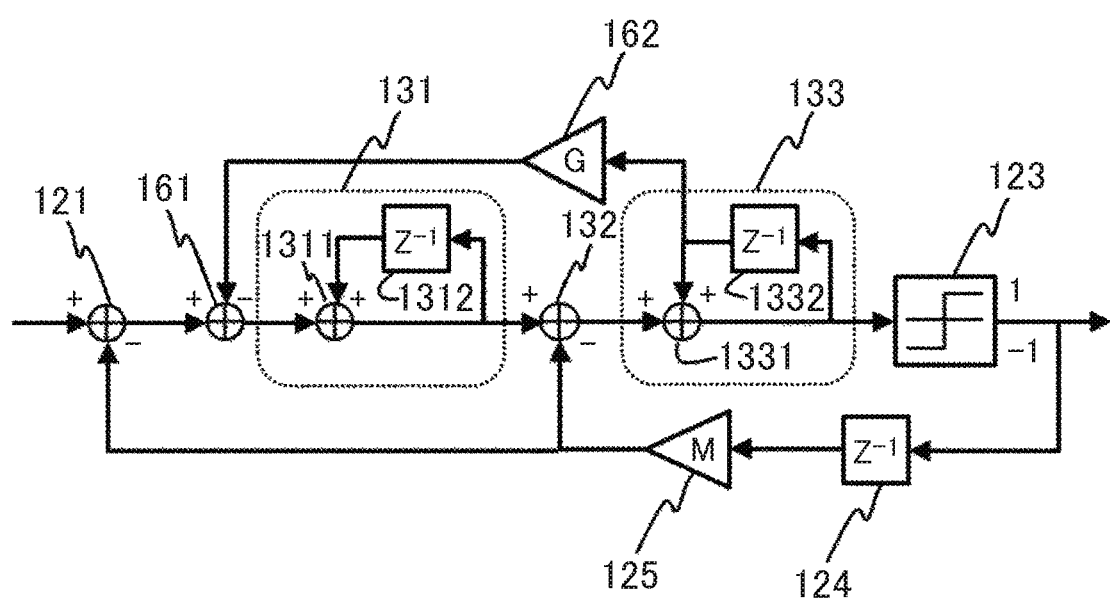
FIG. 16 is another diagram for supplementarily explaining the fifth embodiment.

An example of the configuration and operation of a BP (bandpass) delta-sigma modulator will be explained as an example of the delta-sigma modulator 1101 with reference to FIG. 16. This configuration is a configuration obtained by adding a local negative feedback including a digital gain 162 with its gain G and a subtractor 161 to the configuration of the second-order delta-sigma modulator shown in FIG. 13. A configuration, in which, after the output of an adder 1311 is delayed by a 1-clock period by a 1-sample delay device 1312, the delayed output is added to an input by the adder 1311, forms a no-delay integrator 131. Similarly, a configuration, in which, after the output of an adder 1311 is delayed by a 1-clock period by a 1-sample delay device 1312, the delayed output is added to an input by the adder 1331, forms a second no-delay integrator 133.

The signal integrated by the no-delay integrator 131 passes through a subtractor 132, and a second integration is further executed on the signal in the no-delay integrator 133. On the other hand, an output signal of a 1-sample delay device 1332, that is, a signal obtained by delaying the output of the no-delay integrator 133 by a 1-clock period is multiplied G times by the digital gain 162, and the G times multiplied signal is subtracted in the subtractor 161 located before the no-delay integrator 131. With this, a local feedback control loop is formed. In addition, the output of the no-delay integrator 133 is binarized into +1 or −1 depending on whether the value of the output is positive or negative in a 1-bit quantizer 123. The output of the 1-bit quantizer 123 can be considered to be the output of the BP delta-sigma modulator.

Furthermore, after being delayed by a 1-clock period by a 1-sample delay device 124, the output of the 1-bit quantizer 123 is M times amplified by a digital gain 125. The M times amplified signal is subtracted from an input signal in a subtractor 121, so that a negative feedback loop is formed. In addition, the M times amplified signal is also subtracted from the output of the no-delay integrator 131 by the subtractor 132. The output of the BP delta-sigma modulator becomes a binary signal that is obtained by pulse-density-modulating the input signal and that has a value +1 or −1. The binarization is executed in the 1-bit quantizer 123, and on this occasion, quantization errors are generated. Thorough the workings of the two integrations, the local negative feedback control, and the negative feedback control, components caused by the quantization errors massively appear in a high-frequency range in the vicinity of a Nyquist frequency (=1/(2T)) at the output of the BP delta-sigma modulator, and the components are suppressed in the vicinity of a frequency position corresponding to the digital gain 162 with its gain G.

Therefore, the output of the BP delta-sigma modulator is a 1-bit (binary) signal including sufficient amounts of high-frequency components, so that the output of the BP delta-sigma modulator is suitable for the operation of the present invention. Here, the input signal range that can be treated by the BP delta-sigma modulator becomes approximately ±M owing to the digital gain 125 with its gain M shown in FIG. 16. Therefore, the value of M is appropriately set in consideration of the amplitude range of the servo control value output by the PID control circuit 76.

Embodiment 6

The configuration of a MEMS electrostatic capacitor type acceleration sensor according to a sixth embodiment will be explained with reference to FIG. 17. Although the sixth embodiment is similar to the fifth embodiment, a pair of MEMS capacitors in the sixth embodiment is given asymmetric diversity, so that the influence exerted on the pair of MEMS capacitors by gravity is alleviated.

This MEMS acceleration sensor is disposed in such a way that the vibration direction (an up-down direction in FIG. 17) of a movable electrode 11 is in accord with the vertical direction. In other words, a direction in which a gravitational force is applied to the movable electrode 11 is downward in FIG. 17.

Figure 17:
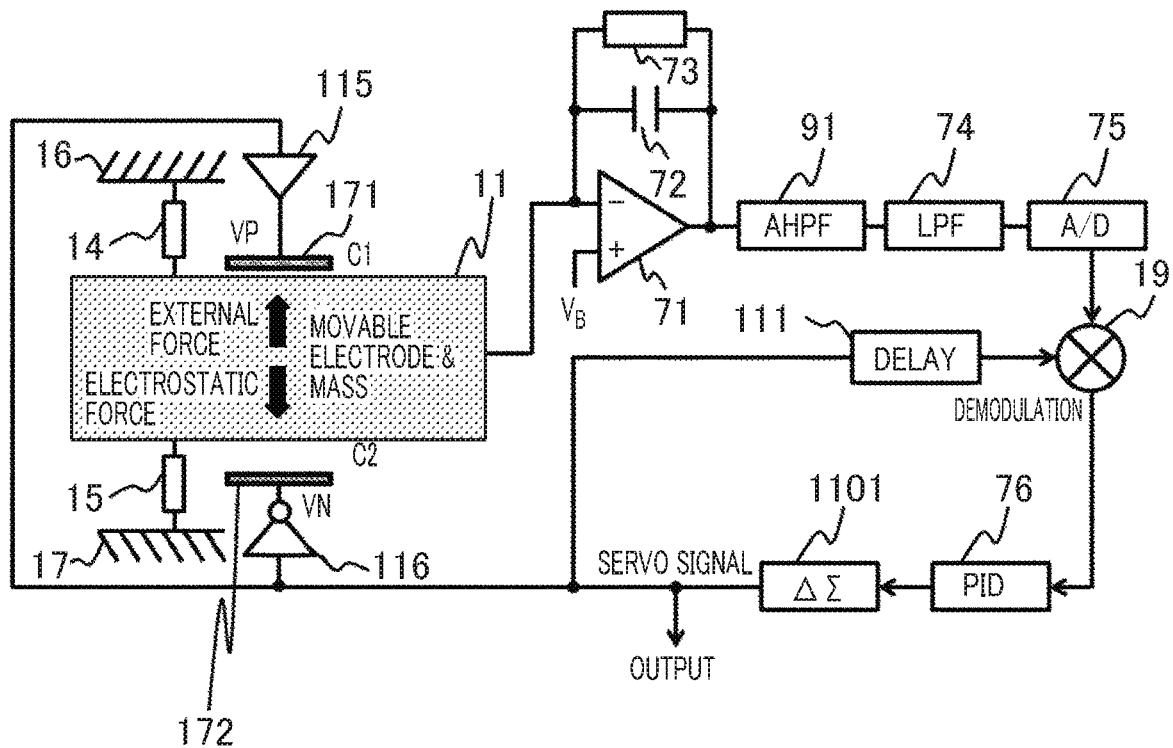
FIG. 17 is a diagram for explaining a MEMS electrostatic capacitor type acceleration sensor according to a sixth embodiment.

In the sixth embodiment, as shown in FIG. 17, when the movable electrode 11 is located so that the lengths of a spring 14 and a spring 15 are natural lengths, a fixed electrode 171 is gotten up to the movable electrode 11 and a fixed electrode 172 is kept away from the movable electrode 11 in such a way that the value of a capacitor C1 formed between the movable electrode 11 and the fixed electrode 171 becomes larger than the value of a capacitor C2 formed between the movable electrode 11 and the fixed electrode 172. Here, the area of the fixed electrode 171 and the area of the fixed electrode 172 are set equal to each other.

When this MEMS electrostatic capacitor type acceleration sensor is disposed as mentioned above, the direction in which the gravitational force is applied to the movable electrode 11 is downward, so that the movable electrode 11 is displaced downward. The displacement is generated in such a way that upward elastic forces which the spring 14 and the spring 15 exert on the movable electrode 11 balance with the downward gravitational force exerted on the movable electrode 11. Owing to this displacement, the value of the capacitance C1 formed between the movable electrode 11 and the fixed electrode 171 becomes smaller, and the value of the capacitance C2 formed between the movable electrode 11 and the fixed electrode 172 becomes larger. Therefore, it becomes possible to set the value of the capacitor C1 and the value of the capacitor C2 equal to each other by appropriately adjusting the disposition of the fixed electrode 171 and the disposition of the fixed electrode 172 when the gravitational force is applied to the movable electrode 11.

With this, the operation of the MEMS electrostatic capacitor type acceleration sensor according to the sixth embodiment becomes equivalent to that of the MEMS electrostatic capacitor type acceleration sensor according to the fifth embodiment in the case where gravity is not applied (θ=90°). In the case where gravity is applied (θ=0°), although it is necessary to generate an electrostatic force corresponding to the sum of an input acceleration signal and gravitational acceleration in the MEMS electrostatic capacitance type acceleration sensor according to the fifth embodiment, it is necessary to generate electrostatic force corresponding to only the input acceleration signal in the MEMS electrostatic capacitance type acceleration sensor according to the sixth embodiment. Therefore, the voltage levels of the servo voltage signals VP and VN can be more reduced in the latter embodiment, so that charge-discharge power consumptions at the pair of MEMS capacitors and parasitic capacitors can be reduced.

Embodiment 7

The configuration of a MEMS electrostatic capacitor type acceleration sensor according to a seventh embodiment will be explained with reference to FIG. 18. As is the case with the sixth embodiment, a pair of MEMS capacitors in the seventh embodiment is given asymmetric diversity, so that the influence exerted on the pair of MEMS capacitors by gravity is alleviated.

This MEMS electrostatic capacitor type acceleration sensor is disposed in such a way that the vibration direction (an up-down direction in FIG. 18) of a movable electrode 11 is in accord with the vertical direction. In other words, a direction in which a gravitational force is applied is downward in FIG. 18.

Figure 18:
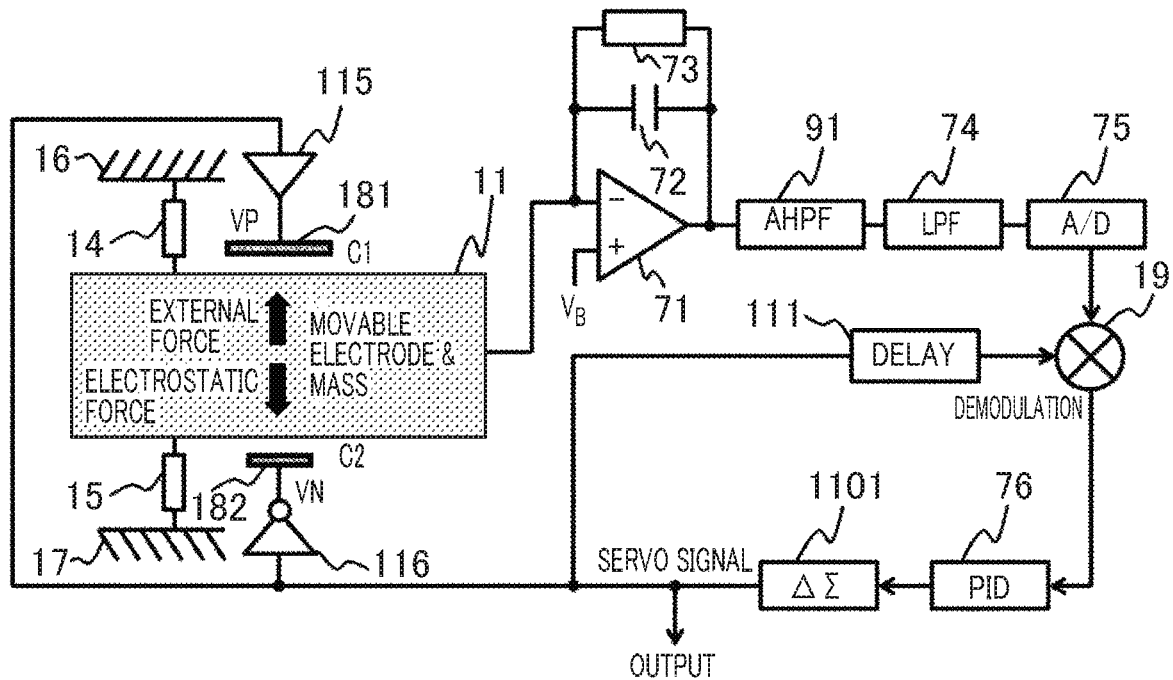
FIG. 18 is a diagram for explaining a MEMS electrostatic capacitor type acceleration sensor according to a seventh embodiment.

In the seventh embodiment, as shown in FIG. 18, when the movable electrode 11 is located so that the lengths of a spring 14 and a spring 15 are natural lengths, the area of a fixed electrode 181 is set larger than the area of a fixed electrode 182 in such a way that the value of a capacitor C1 formed between the movable electrode 11 and the fixed electrode 181 becomes larger than the value of a capacitor C2 formed between the movable electrode 11 and the fixed electrode 182. Here, a distance between the movable electrode 11 and the fixed electrode 181 and a distance between the movable electrode 11 and the fixed electrode 182 are set equal to each other.

When this MEMS electrostatic capacitor type acceleration sensor is disposed as mentioned above, the direction in which the gravitational force is applied to the movable electrode 11 is downward, so that the movable electrode 11 is displaced downward. The displacement is generated in such a way that upward elastic forces which the spring 14 and the spring 15 exert on the movable electrode 11 balance with the downward gravitational force exerted on the movable electrode 11. Owing to this displacement, the value of the capacitance C1 formed between the movable electrode 11 and the fixed electrode 181 becomes smaller, and the value of the capacitance C2 formed between the movable electrode 11 and the fixed electrode 182 becomes larger. However, it becomes possible to set the value of the capacitor C1 and the value of the capacitor C2 equal to each other at the time when gravity is applied by appropriately adjusting the area of the fixed electrode 181 and the area of the fixed electrode 182.

With this, the operation of the MEMS electrostatic capacitor type acceleration sensor according to the seventh embodiment becomes equivalent to that of the MEMS electrostatic capacitor type acceleration sensor according to the fifth embodiment in the case where gravity is not applied ($\theta$=90°). Although, in the case where gravity is applied ($\theta$=0°), although it is necessary to generate an electrostatic force corresponding to the sum of an input acceleration signal and gravitational acceleration in the MEMS electrostatic capacitance type acceleration sensor according to the fifth embodiment, it is necessary to generate an electrostatic force corresponding to only the input acceleration signal in the MEMS electrostatic capacitance type acceleration sensor according to the seventh embodiment. Therefore, the voltage levels of the servo voltage signals VP and VN can be more reduced in the seventh embodiment, so that charge-discharge power consumptions at the pair of MEMS capacitors and parasitic capacitors can be reduced in the seventh embodiment.

Eighth Embodiment

The configuration of a MEMS electrostatic capacitor type acceleration sensor according to an eighth embodiment will be explained with reference to FIG. 19.

The configuration of the eighth embodiment is equivalent to the configuration of the fifth embodiment plus an adder 191 inserted between the demodulator 19 and the PID control circuit 76 of the fifth embodiment.

Figure 19:
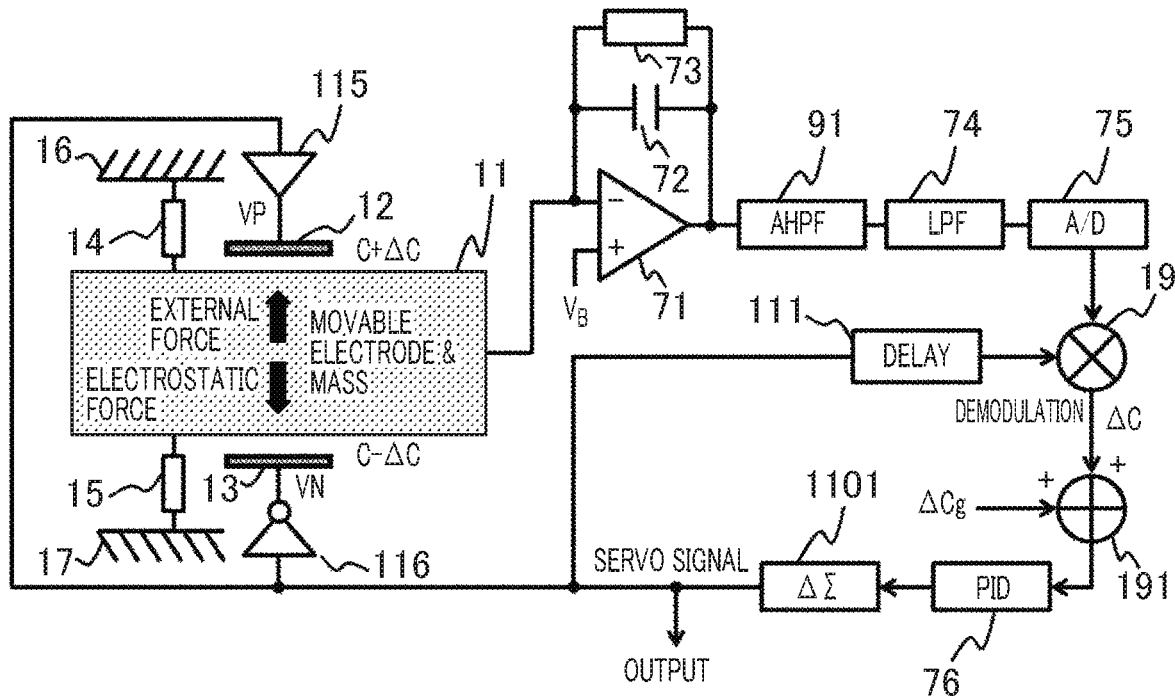
FIG. 19 is a diagram for explaining a MEMS electrostatic capacitor type acceleration sensor according to an eighth embodiment.

As described above, when an angle between the vibration direction of a movable electrode 11 (an up-down direction shown in FIG. 19) and the vertical direction is denoted by $\theta$, a gravitational force m*g*cos $\theta$ is applied to the movable electrode 11 downward in FIG. 19. As a result, the movable electrode 11 is displaced downward. The displacement is generated in such a way that upward elastic forces that are exerted on the movable electrode 11 by a spring 14 and a spring 15 balances with the downward gravitational force m*g*cos $\theta$. A negative component is generated at a capacitance variation $\Delta$C corresponding the downward displacement. Therefore, a DC signal "-$\Delta$Cg" corresponding to the negative DC component is included in output of the demodulator 19. Since the gain of a C/V conversion amplifier and the like in a detection circuit 18 are known, if $\theta$ is known, the value of "-$\Delta$Cg" becomes known.

Therefore, in the eighth embodiment, the DC signal "-$\Delta$Cg" is canceled by adding the known "$\Delta$Cg" in the adder 191 inserted in a stage subsequent to the demodulator 19, so that the configuration in which an influence owing to gravity is not transferred to the PID control circuit 76 is achieved. As a result, an electrostatic force generated by servo voltage signals VP and VN have only to balance with an inertial force owing to an input acceleration signal.

Therefore, on the condition that gravity is applied, the voltage levels of the servo voltage signals VP and VN in the case of the MEMS electrostatic capacitor type acceleration sensor according to the eighth embodiment can be more reduced than in the case of the MEMS electrostatic capacitor type acceleration sensor according to the fifth embodiment. As a result, charge-discharge power consumptions at a pair of MEMS capacitors and parasitic capacitors can be reduced. Here, in the eighth embodiment, the movable electrode 11 is kept displaced downward as mentioned above.

Ninth Embodiment

The configuration of a MEMS electrostatic capacitor type acceleration sensor according to a ninth embodiment will be explained with reference to FIG. 20.

The configuration of the ninth embodiment is a configuration in which a fixed electrode 201 and a fixed electrode 202 are further added to the configuration of the fifth embodiment, so that the MEMS electrostatic capacitor type acceleration sensor according to the ninth embodiment further includes a second pair of MEMS capacitors composed of a capacitance element formed by the fixed electrode 201 and a movable electrode 11 and a capacitance element formed by the fixed electrode 202 and the movable electrode 11. However, the second pair of MEMS capacitors is not used for applying a carrier signal unlike the second pair of MEMS capacitors according to the related technology 2 shown in FIG. 2, but it is used for applying a DC electrostatic force that cancels an influence owing to gravity.

Figure 20:
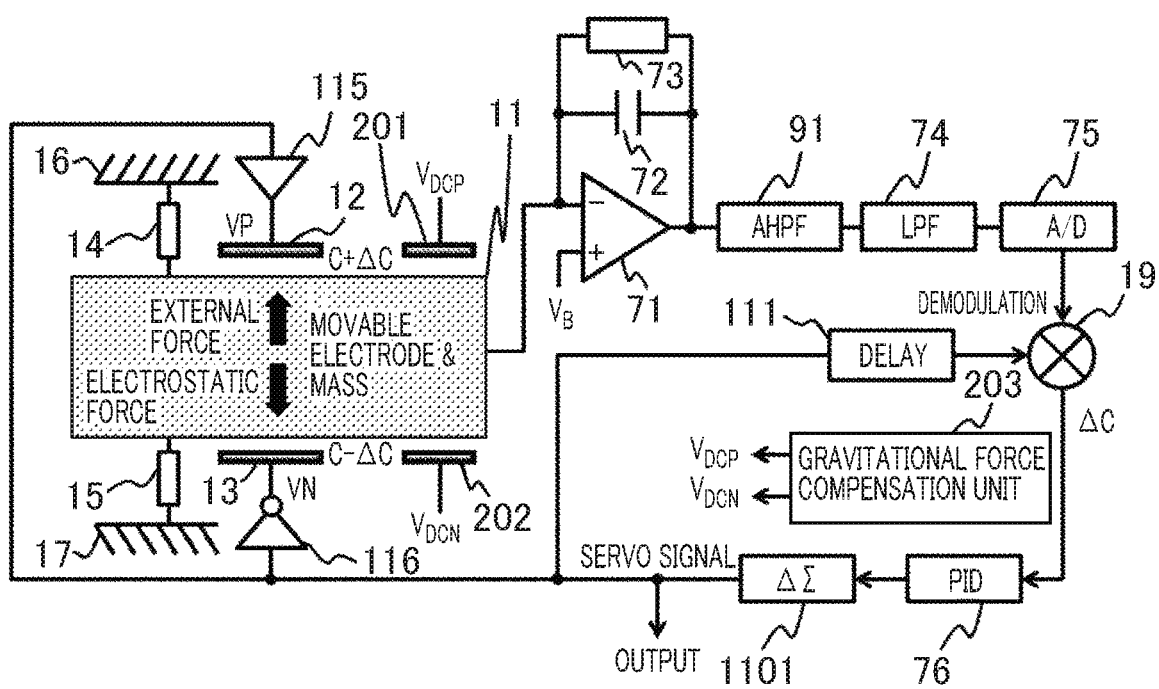
FIG. 20 is a diagram for explaining a MEMS electrostatic capacitor type acceleration sensor according to a ninth embodiment.

AS described above, when an angle between the vibration direction of the movable electrode 11 (an up-down direction shown in FIG. 19) and the vertical direction is denoted by $\theta$, a gravitational force m*g*cos $\theta$ is applied to the movable electrode 11 downward in FIG. 20.

Therefore, in the case where $\theta$ is known, a gravitational force compensation unit 203 determines DC voltages $V_{DCP}$ and $V_{DCN}$ that are necessary for applying an electrostatic force whose magnitude is equal to that of the gravitational force m*g*cos $\theta$ and whose direction is upward to the movable electrode 11, and the gravitational force compensation unit 203 applies these DC voltages to the fixed electrodes 201 and 202 respectively. With this, the influence owing to gravity is canceled, so that the operation of the MEMS acceleration sensor according to this embodiment is equivalent to that of the MEMS acceleration sensor according to the fifth embodiment in the case where gravity is not applied in the MEMS acceleration sensor according to the fifth embodiment.

Therefore, servo voltage signals VP and VN have only to generate an electrostatic force corresponding to an input acceleration signal in the MEMS electrostatic capacitor type acceleration sensor according to the ninth embodiment. Therefore, the voltage levels of the servo voltage signals VP and VN can be reduced. AS a result, charge-discharge power consumptions at the pairs of MEMS capacitors and parasitic capacitors can be reduced.

Tenth Embodiment

Figure 21:
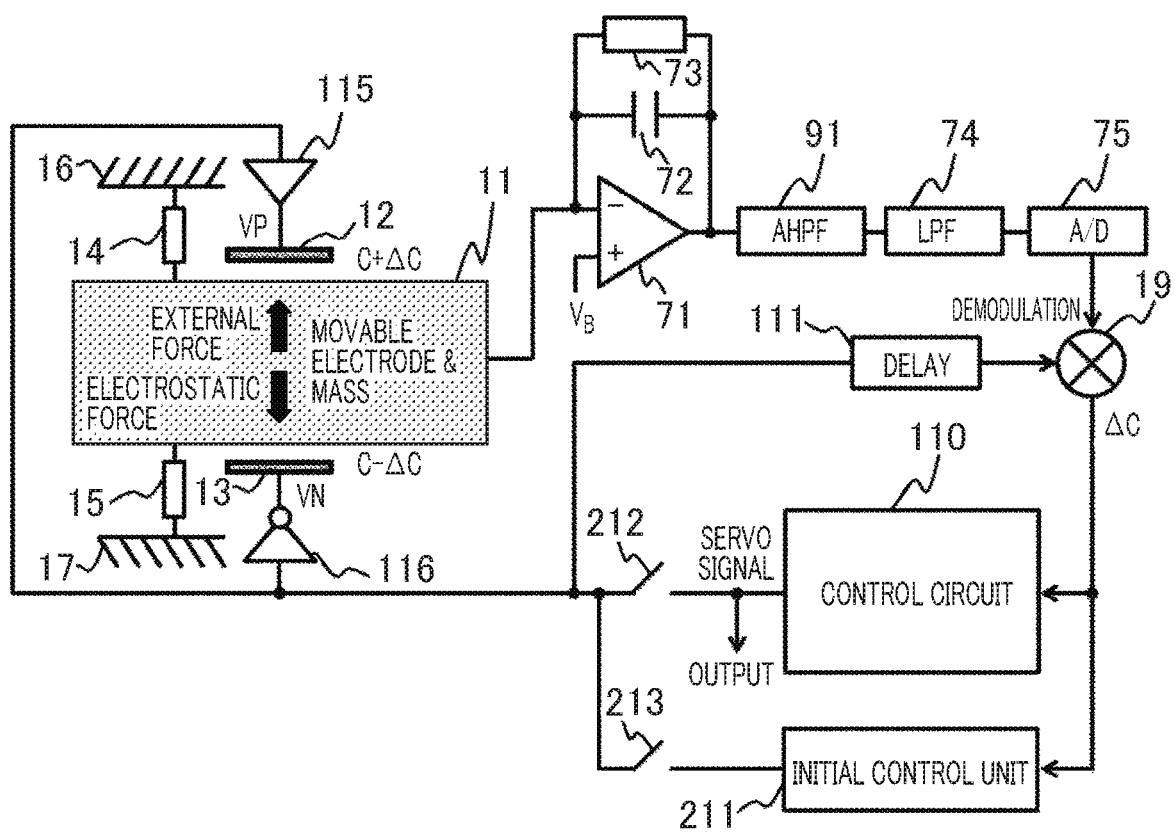
FIG. 21 is a diagram for explaining a MEMS electrostatic capacitor type acceleration sensor according to a tenth embodiment.

The configuration of a MEMS electrostatic capacitor type acceleration sensor according to a tenth embodiment will be explained with reference to FIG. 21.

The configuration of the tenth embodiment is a configuration in which an initial control unit 211 and switches 213 and 212, which are used for switching between the initial control unit 211 and a control circuit 110 as a control unit, are added to the configuration of the third embodiment.

First, the switch 213 is turned on, and the switch 212 is turned off, so that the output of the initial control unit 211 is applied to a fixed electrode 12 and a fixed electrode 13 via a buffer 115 and an inversion buffer 116 respectively. The initial control unit 211 operates in two phases, that is, in a first phase in which a gravity component is estimated, and a second phase in which an initial servo signal is generated and applied.

In the first phase, the initial control unit 211 outputs a pulse signal that has a constant frequency and a duty ratio 50% as a carrier signal, and the initial control unit 211 applies the pulse signal to the fixed electrodes 12 and 13 as differential carrier signals respectively. Hence, the gravity component of the gravitational force m*g*cos θ, which has been explained in the ninth embodiment, is detected and estimated.

As a result, a movable electrode 11 is displaced owing to the gravity component, and a capacitance variation ΔC is generated in proportion to the displacement. By applying the carrier signal to the fixed electrodes 12 and 13, a charge signal corresponding to the product of the capacitance variation ΔC and the carrier signal is generated on the fixed electrode 11. The charge signal is converted into a voltage signal by a C/V conversion amplifier in a detection circuit, and the voltage signal is converted into a digital value by an A/D converter 75.

The signal converted into the digital value is multiplied by the carrier signal output from the initial control unit 211 in a demodulator 19, so that a signal proportional to ΔC is obtained at the output of the demodulator 19. The displacement can be estimated by multiplying the signal proportional to ΔC by a known prescribed value that is determined by design parameters dependent on the areas of the fixed electrodes 12 and 13, a distance between the fixed electrode 12 and the movable electrode 11, and a distance between the fixed electrode 13 and the movable electrode 11. Furthermore, the gravity component can be estimated by multiplying the estimated value of the displacement by the spring constants of the springs 14 and 15.

In the second phase, the initial control unit 211 generates the 1-bit initial servo signal for canceling the gravity component on the basis of the estimated value of the gravity component. For example, by inputting the estimated value of the gravity component into a 1-bit output type digital delta-sigma modulator, the 1-bit initial servo signal can be obtained at the output of the 1-bit output type digital delta-sigma modulator.

By continuing applying the initial servo signal obtained as mentioned above to the fixed electrodes 12 and 13 for a while via the buffer 115 and the inversion buffer 116 respectively, the gravity component and an electrostatic force owing to the initial servo signal becomes equal to each other, so that the displacement of the movable electrode 11 is set approximately zero.

Subsequently, the switch 212 is turned on and the switch 213 is turned off on the condition that the displacement is set approximately zero, so that the output of the control circuit 110 is applied to the fixed electrodes 12 and 13 via the buffer 115 and the inversion buffer 116 respectively. After this, the MEMS electrostatic capacitor type acceleration sensor according to this embodiment operates similarly to other embodiments in a similar configuration to the configurations of the other embodiments, and finally the MEMS electrostatic capacitor type acceleration sensor comes into a steady state where an external force applied to the movable electrode 11 balances with the electrostatic force owing to the servo signal output from the control circuit 110.

As described above in this tenth embodiment, by setting the displacement of the movable electrode 11 approximately zero in advance using the initial control unit 211, the main operation of the MEMS electrostatic capacitor type acceleration sensor using the control circuit 110 can be started from a state where the displacement of the movable electrode 11 is approximately zero. Therefore, the amplitude of the signal just after the start of the main operation can be reduced. As a result, erroneous operations such as the saturation of the detection circuit can be prevented.

Eleventh Embodiment

The configuration of a MEMS electrostatic capacitor type acceleration sensor according to an eleventh embodiment will be explained with reference to FIG. 22.

The MEMS electrostatic capacitor type acceleration sensor according to the eleventh embodiment is similar to the acceleration sensor according to the fifth embodiment except for a point that the sensor of the MEMS electrostatic capacitor type acceleration sensor according to the eleventh embodiment is a graded-up triaxial acceleration sensor. Therefore, fixed electrodes 12A and 13A are used for dealing with an acceleration in the direction of X axis, fixed electrodes 12B and 13B for dealing with an acceleration in the direction of Y axis, and fixed electrodes 12C and 13AC for dealing with an acceleration in the direction of Z axis. A charge signal X corresponding to the direction of X axis, a charge signal Y corresponding to the direction of Y axis, and a charge signal Z corresponding to the direction of Z axis are superimposed on the movable electrode 11.

Figure 22:
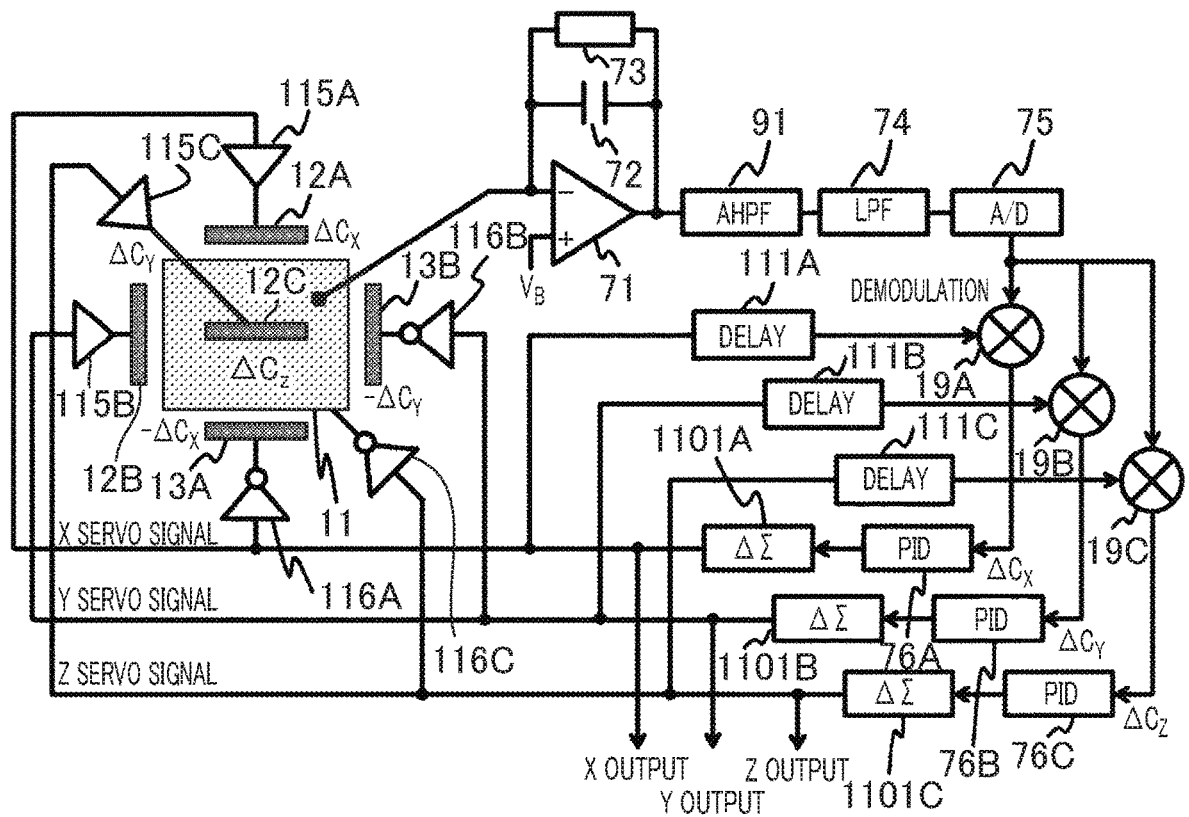
FIG. 22 is a diagram for explaining a MEMS electrostatic capacitor type acceleration sensor according to an eleventh embodiment.

As shown in FIG. 22, after being dealt with by a common detection circuit, the charge signals X, Y, and Z are multiplied by 1-bit servo signals corresponding to the charge signals X, Y, and Z in demodulators 19A, 19B, and 19C respectively, so that signals corresponding to respective capacitance variations $\Delta C_X$, $\Delta C_Y$, $\Delta C_Z$ are obtained. Respective PID control circuits 76A, 76B, and 76C calculate respective servo control values on the basis of the signals corresponding to the respective capacitance variations, and respective delta-sigma modulators 1101A, 1101B, and 1101C generate the respective 1-bit servo signals after bringing in the respective servo control values.

In addition, the respective 1-bit servo signals and inversion signals corresponding to the respective 1-bit servo signals are applied as voltage signals to the fixed electrodes 12A, 12B, 12C, 13A, 13B, and 13C via buffers 115A, 115 B, 115C and inversion buffers 116A, 116B, 116C respectively.

Figure 23:
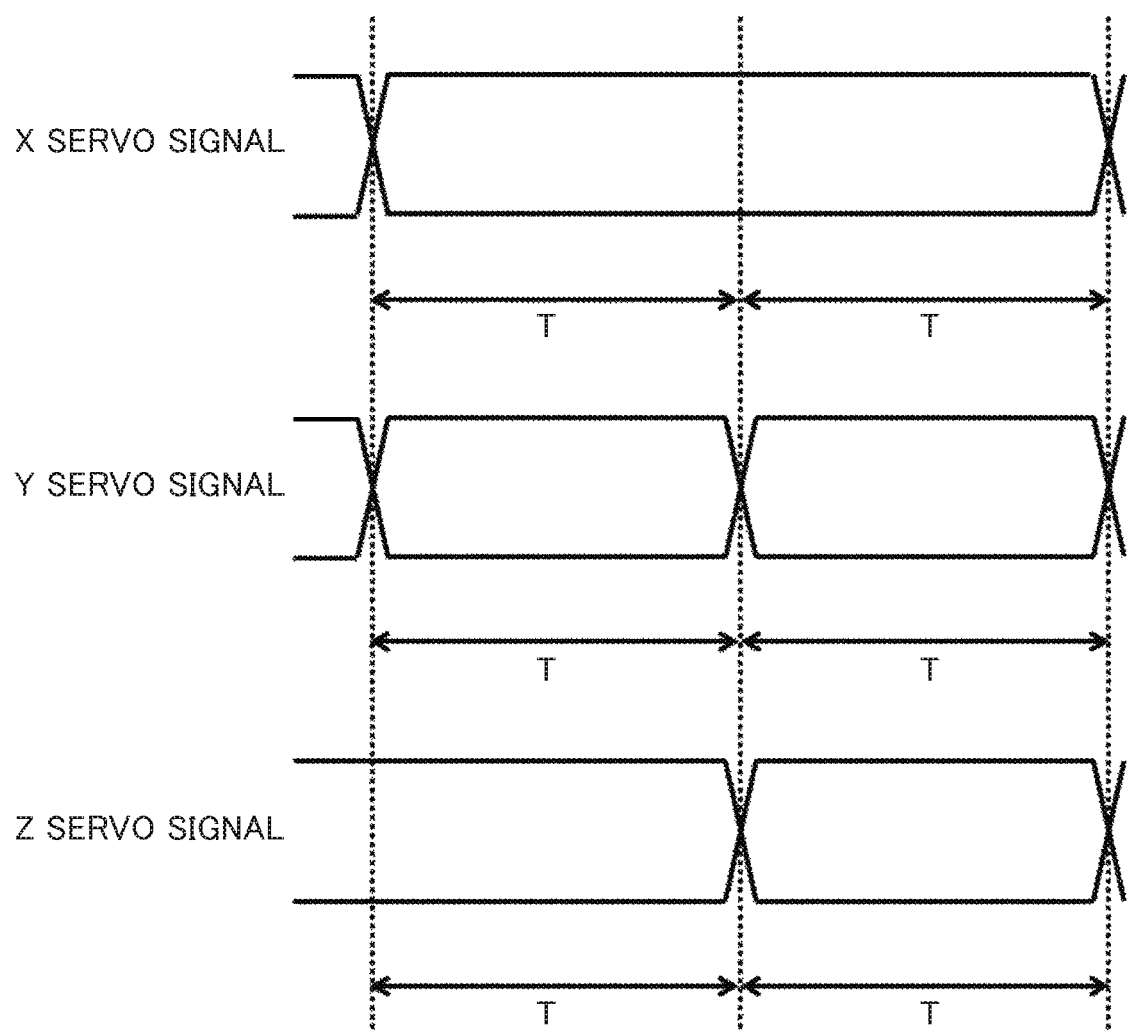
FIG. 23 is an operation time chart of the MEMS electrostatic capacitor type acceleration sensor according to the eleventh embodiment.

An operation time chart according to the eleventh embodiment is shown in FIG. 23. In the eleventh embodiment, attention is paid on a fact that, even if the single movable electrode and the common detection circuit are used, the capacitance variation signals corresponding to the respective axes can be separated from one another using the demodulators 19A, 19B, and 19C respectively because the servo signals corresponding to the respective axes are non-correlated with one another.

In this embodiment, the operation of the acceleration sensor disclosed in the fifth embodiment is conducted in parallel in a triaxial manner. With this, a triaxial acceleration sensor can be put into practice in the simplest configuration, so that the reduction of the manufacturing costs and the reduction of the variations of electrical and mechanical characteristics of the MEMS elements can be realized. Since the acceleration signal detection and the servo control can be performed simultaneously in parallel, the high-speed operation and high voltages of the circuits become unnecessary, so that power consumptions at the circuits can be reduced. Furthermore, the configurations of the MEMS elements can be made small-sized and simple, so that the reduction of the manufacturing costs and the reduction of the variations of electrical and mechanical characteristics of the MEMS elements can be realized.

In the MEMS electrostatic capacitor type acceleration sensor according to the above-described seventh embodiment, the 1-bit servo signal for controlling the MEMS elements is also used as a carrier signal for detecting the capacitance variations of the MEMS elements. With this, both acceleration signal detection and servo control are performed simultaneously in parallel using only one pair of MEMS capacitors.

As a result, since the acceleration signal detection and the servo control can be performed simultaneously in parallel, the high-speed operation and high voltages of the circuits become unnecessary, so that power consumptions at the circuits can be reduced. In addition, the configurations of the MEMS elements can be made small-sized and simple, so that the reduction of the manufacturing costs and the reduction of the variations of electrical and mechanical characteristics of the MEMS elements can be realized.

Twelfth Embodiment

Figure 24:
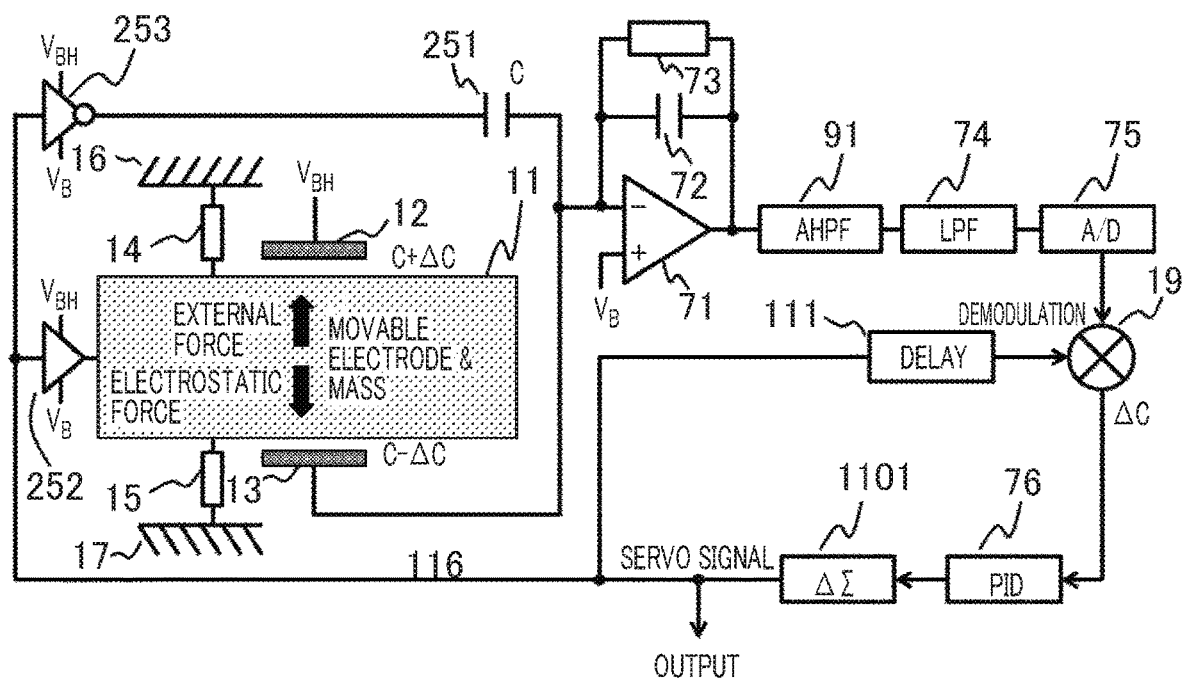
FIG. 24 is a diagram for explaining a MEMS electrostatic capacitor type acceleration sensor according to a twelfth embodiment.

The configuration of a MEMS electrostatic capacitor type acceleration sensor according to a twelfth embodiment will be explained with reference to FIG. 24.

Although the twelfth embodiment is similar to the fifth embodiment (refer to FIG. 11) except for a point in which the role of one of the fixed electrodes and the role of the movable electrode of the MEMS capacitance element according to the fifth embodiment are replaced in the twelfth embodiment, the twelfth embodiment has a similar configuration, a similar operation, and similar advantageous effects to those of the fifth embodiment in other points.

Although the movable electrode 11 is connected to the input of the detection circuit, that is, to the inversion input node of the operational amplifier 71 in the fifth embodiment, a fixed electrode 13 is connected to the inversion input node in the twelfth embodiment. Furthermore, a DC voltage $V_{BH}$ is applied to the other fixed electrode 12.

In addition, although the 1-bit servo signal is applied to the two fixed electrodes 12 and 13 via the buffer 115 and the inversion buffer 116 respectively in the fifth embodiment, a 1-bit servo signal is applied to a movable electrode 11 via a buffer 252, and the 1-bit servo signal is applied to a capacitance element 251 via an inversion buffer 253 in the twelfth embodiment. Here, the capacitance value of the capacitance element 251 is set equal to C.

Here, each of the buffer 252 and the inversion buffer 253 outputs $V_{BH}$ equal to the DC potential of the fixed electrode 12 as H voltage, and outputs $V_B$ equal to the DC potential of the fixed electrode 13 as L voltage ($V_B$ is equal to the DC potential of the fixed electrode 13 owing to the virtual grounding of the operational amplifier 71).

In the abovementioned configuration, an electrostatic force is generated by a pair of capacitances composed of a capacitance element formed by the fixed electrode 12 and the movable electrode 11 and a capacitance element formed by the fixed electrode 13 and the movable electrode 11. The electrostatic force is proportional to the product of the 1-bit servo signal and ($V_{BH}$–$V_B$). Therefore, as is the case with the fifth embodiment, the electrostatic force proportional to the 1-bit servo signal can be applied to the movable electrode 11. For example, it is conceivable that $V_{BH}$ is set to a high voltage, and $V_B$ is set to a half the power supply voltage of the operational amplifier 71 so that the output amplitude range of the operational amplifier 71 becomes appropriate.

Unlike in the case of the fifth embodiment, the detection of a capacitance variation ΔC is executed only at the capacitance element formed by the fixed electrode 13 and the movable electrode 11 in the case of the twelfth embodiment. In other words, a charge corresponding to the product of (C–ΔC), which is the capacitance value of the capacitance element, and the ΔC component of the output of the buffer 252, that is, a charge signal proportional to the product of (C–ΔC) and the 1-bit servo signal is injected into the inversion input node of the operational amplifier 71.

On the other hand, a charge corresponding to the product of the capacitance value C of the capacitance element 251 and the ΔC component of the output of the inversion buffer 253, that is, a reference charge signal proportional to the product of C and the inversion signal of the 1-bit servo signal is injected into the inversion input node of the operational amplifier 71 from the capacitance element 251.

Therefore, the sum of the charge signal and the reference charge signal is injected into the inversion input node of the operational amplifier 71. With this, a component proportional to the product of C and the 1-bit servo signal included in the charge signal is canceled by the reference charge signal. As a result, only a component proportional to the product of ΔC and the 1-bit servo signal is injected into the inversion input node of the operational amplifier 71 as a net charge.

As described above, as is the case with the fifth embodiment, the application of the electrostatic force and detection of ΔC can be executed in the twelfth embodiment. Therefore, as is the case with the fifth embodiment, by executing demodulation in the demodulator 19 using a signal on the basis of the 1-bit servo signal, a signal proportional to ΔC can be obtained at the output of the demodulator 19.

In the twelfth embodiment, it is possible to generate the electrostatic force using only the 1-bit servo signal without using the inversion signal of the 1-bit servo signal. Therefore, there is an advantageous effect in that, even if a skew between these signals is large, the degradation of the performance of the MEMS electrostatic capacitor type acceleration sensor owing to noises does not easily occur in the twelfth embodiment. On the other hand, it is conceivable that, since it is necessary to make the capacitance value of the capacitance element 251 equal to C, for example, an adjusting mechanism for that purpose is additionally prepared.

What is claimed is:

1. A MEMS electrostatic capacitor type accelerator sensor comprising:
 a pair of MEMS capacitors including a movable electrode, a first fixed electrode, and a second fixed electrode;
 a detection circuit connected to the movable electrode;
 a demodulation circuit connected to the detection circuit;
 a control circuit that is connected to the demodulation circuit and outputs a binary servo signal; and
 a delay device connected to the demodulation circuit,
 wherein a voltage signal based on the servo signal output by the control circuit is applied to the first fixed electrode, a voltage signal based on a signal obtained by logically reversing the servo signal is applied to the second fixed electrode, and an electrostatic force, which balances with an inertial force generated on the movable electrode by applying an acceleration signal and the direction of which is opposite to a direction of the inertial force, is generated on the movable electrode, the detection circuit generates a voltage signal corresponding to the product of a difference between two capacitance values of the pair of the MEMS capacitors and the servo signal, the demodulation circuit outputs a signal corresponding to the difference between the capacitance values using the servo signal, the control circuit outputs the servo signal on the basis of a signal corresponding to the difference between the capacitance values, the servo signal is delayed by the delay device by a time, and the time is equal to a delay time, the delay time being when a charge signal is sent from the pair of MEMS capacitors to the detection circuit.

2. The MEMS electrostatic capacitor type acceleration sensor according to claim 1, wherein the demodulation circuit executes multiplication.

3. The MEMS electrostatic capacitor type acceleration sensor according to claim 1, wherein the demodulation circuit executes correlation calculation.

4. The MEMS electrostatic capacitor type acceleration sensor according to claim 1, wherein the delay device provided between the control circuit and the demodulation circuit, and wherein the servo signal output by the control circuit is applied to the demodulation circuit via the delay device.

5. The MEMS electrostatic capacitor type acceleration sensor according to claim 1, wherein the control circuit includes a PID control circuit and a 1-bit quantizer connected to the PID control circuit, and the 1-bit quantizer outputs the servo signal.

6. The MEMS electrostatic capacitor type acceleration sensor according to claim 1, wherein the control circuit includes a PID control circuit and a delta-sigma modulator connected to the PID control circuit, and the delta-sigma modulator outputs the servo signal.

7. The MEMS electrostatic capacitor type acceleration sensor according to claim 6, further comprising an adder provided between the demodulation circuit and the PID control circuit.

8. The MEMS electrostatic capacitor type acceleration sensor according to claim 1, wherein the detection circuit includes:

a C/V conversion amplifier composed of an operational amplifier, a capacitance element, and a resistance element;

a lowpass filter connected to an output of the C/V conversion amplifier; and an A/D converter connected to an output of the lowpass filter.

9. The MEMS electrostatic capacitor type acceleration sensor according to claim 1, wherein the detection circuit includes:

a C/V conversion amplifier composed of an operational amplifier, a capacitance element, and a resistance element;

a highpass filter connected to an output of the C/V conversion amplifier; and an A/D converter connected to an output of the highpass filter.

10. The MEMS electrostatic capacitor type acceleration sensor according to claim 1, further comprising a highpass filter connected to the control circuit, wherein the demodulation circuit outputs a signal corresponding to the difference between the two capacitance values using a signal obtained by processing the servo signal by means of the highpass filter.

11. The MEMS electrostatic capacitor type acceleration sensor according to claim 1, further comprising a third fixed electrode and a fourth fixed electrode, wherein a first DC potential is applied to the third fixed electrode and a second DC potential is applied to the fourth fixed electrode, so that an electrostatic force, a direction of which is opposite to a direction of a gravitational force exerted on the movable electrode, is generated on the movable electrode.

12. The MEMS electrostatic capacitor type acceleration sensor according to claim 1, wherein, on a condition that a gravitational force is not applied to the movable electrode, a first distance between the first fixed electrode and the movable electrode and a second distance between the second fixed electrode and the movable electrode are different from each other.

13. The MEMS electrostatic capacitor type acceleration sensor according to claim 1, wherein a first area of the first fixed electrode and a second area of the second fixed electrode are different from each other.

14. A MEMS electrostatic capacitor type accelerator sensor comprising:

a first pair of MEMS capacitors including a movable electrode, a first fixed electrode, and a second fixed electrode;

a second pair of MEMS capacitors including the movable electrode, a third fixed electrode, and a fourth electrode;

a detection circuit connected to the movable electrode;

a first demodulation circuit connected to the detection circuit;

a second demodulation circuit connected to the detection circuit;

a first control circuit that is connected to the first demodulation circuit and outputs a first binary servo signal;

a second control circuit that is connected to the second demodulation circuit and outputs a second binary servo signal; and a delay device connected to the demodulation circuit, wherein a voltage signal based on the first servo signal output by the first control circuit is applied to the first fixed electrode, a voltage signal based on a signal obtained by logically reversing the first servo signal is applied to the second fixed electrode, and an electrostatic force, which balances with an inertial force generated on the movable electrode by applying an acceleration signal in a first axis direction and a direction of which is opposite to a direction of the inertial force, is generated on the movable electrode, a voltage signal based on the second servo signal output by the second control circuit is applied to the third fixed electrode, a voltage signal based on a signal obtained by logically reversing the second servo signal is applied to the fourth fixed electrode, an electrostatic force, which balances with an inertial force generated on the movable electrode by applying an acceleration signal in a second axis direction, which is different from the first axis direction, and the direction of which is opposite to the direction of the inertial force, is generated on the movable electrode, the detection circuit generates a first voltage signal corresponding to the product of a difference between two first capacitance values of the first pair of the MEMS capacitors and the first servo signal, and a second voltage signal corresponding to the product of a difference between two second capacitance values of the second pair of the MEMS capacitors and the second servo signal, the first demodulation circuit outputs a signal corresponding to the difference between the two first capacitance values of the first pair of MEMS capacitors using the first servo signal, the second demodulation circuit outputs a signal corresponding to the difference between the two second capacitance values of the second pair of MEMS capacitors using the second servo signal, the first control circuit outputs the first servo signal on the basis of a signal corresponding to the difference between the two first capacitance values of the first pair of MEMS capacitors, the second control circuit outputs the second servo signal on the basis of a signal corresponding to the difference between the two second capacitance values of the second pair of MEMS capacitors, the first servo signal and the second servo signal are delayed by the delay device by a time, and the time is equal to a delay time, the delay time being when a charge signal is sent from at least one of the first pair of MEMS capacitors and the second pair of MEMS capacitors to the detection circuit.

* * * * *